United States Patent
Takeshita

(10) Patent No.: US 7,340,187 B2
(45) Date of Patent: Mar. 4, 2008

(54) OPTICAL SIGNAL MONITORING METHOD AND APPARATUS

(75) Inventor: Hitoshi Takeshita, Tokyo (JP)

(73) Assignee: NEC Corporation, Tokyo (JP)

(*) Notice: Subject to any disclaimer, the term of this patent is extended or adjusted under 35 U.S.C. 154(b) by 559 days.

(21) Appl. No.: 10/740,789

(22) Filed: Dec. 22, 2003

(65) Prior Publication Data
US 2004/0131355 A1  Jul. 8, 2004

(30) Foreign Application Priority Data
Dec. 25, 2002 (JP) ............... 2002-374880
Nov. 6, 2003 (JP) ............... 2003-376446

(51) Int. Cl.
*H04B 10/06* (2006.01)

(52) U.S. Cl. ............ 398/209; 398/147; 398/158; 398/159; 398/155; 398/162; 398/202; 398/208; 398/214; 398/81; 398/79; 398/33; 398/34; 398/25; 398/26; 398/27; 398/149; 385/24; 385/11; 385/15; 385/37; 385/147; 375/316

(58) Field of Classification Search ............ 398/147, 398/155, 158, 159, 162, 202, 208, 209, 214, 398/81, 79, 25, 26, 33, 27, 38, 141, 149, 398/134; 385/24, 37, 11, 15, 147; 375/316
See application file for complete search history.

(56) References Cited

U.S. PATENT DOCUMENTS 6,694,273 B2 * 2/2004 Kurooka et al. ............ 702/69
6,871,024 B2 * 3/2005 Nishimoto et al. ......... 398/159
2003/0007222 A1 * 1/2003 Kwasaki et al. ............ 359/189

FOREIGN PATENT DOCUMENTS

| JP | 11-068657 A | 3/1989 |
| JP | 11-223575 A | 8/1999 |
| JP | 2000-004260 A | 1/2000 |

OTHER PUBLICATIONS

Kimio Oguchi et al., "Photonic Transport Network Architecture Employing Optical Path Concept", ICC' 97 workshop, Jun. 8-12, 1997.

"Control modulation technique for client independent optical performance monitoring and transport of channel overhead", TuE2, OFC (2002).

Ikuyo Yoshida, "Introuction to Latest ASP", Gijutsu Hyoron Sha, Jul. 2001, Sec. 9 in Chapter 6.

* cited by examiner

*Primary Examiner*—Hanh Phan
(74) *Attorney, Agent, or Firm*—Sughrue Mion, PLLC

(57) ABSTRACT

In an optical signal monitoring method in wavelength multiplexing and an optical network, an area corresponding to a characteristic pattern of an eye pattern of an optical signal to be monitored, which characterizes a deterioration, is extracted from a database storing a map which associates a quality deterioration factor and deterioration amount of the optical signal with the characteristic pattern of the area of the eye pattern of the optical signal. The extracted pattern is collated with the map stored in the database to monitor the quality deterioration factor and deterioration amount of the optical signal, an occurrence time of a deterioration, duration of a deterioration, a deterioration occurrence cycle, and a deterioration duration cycle. An optical signal monitoring apparatus is also disclosed.

42 Claims, 19 Drawing Sheets

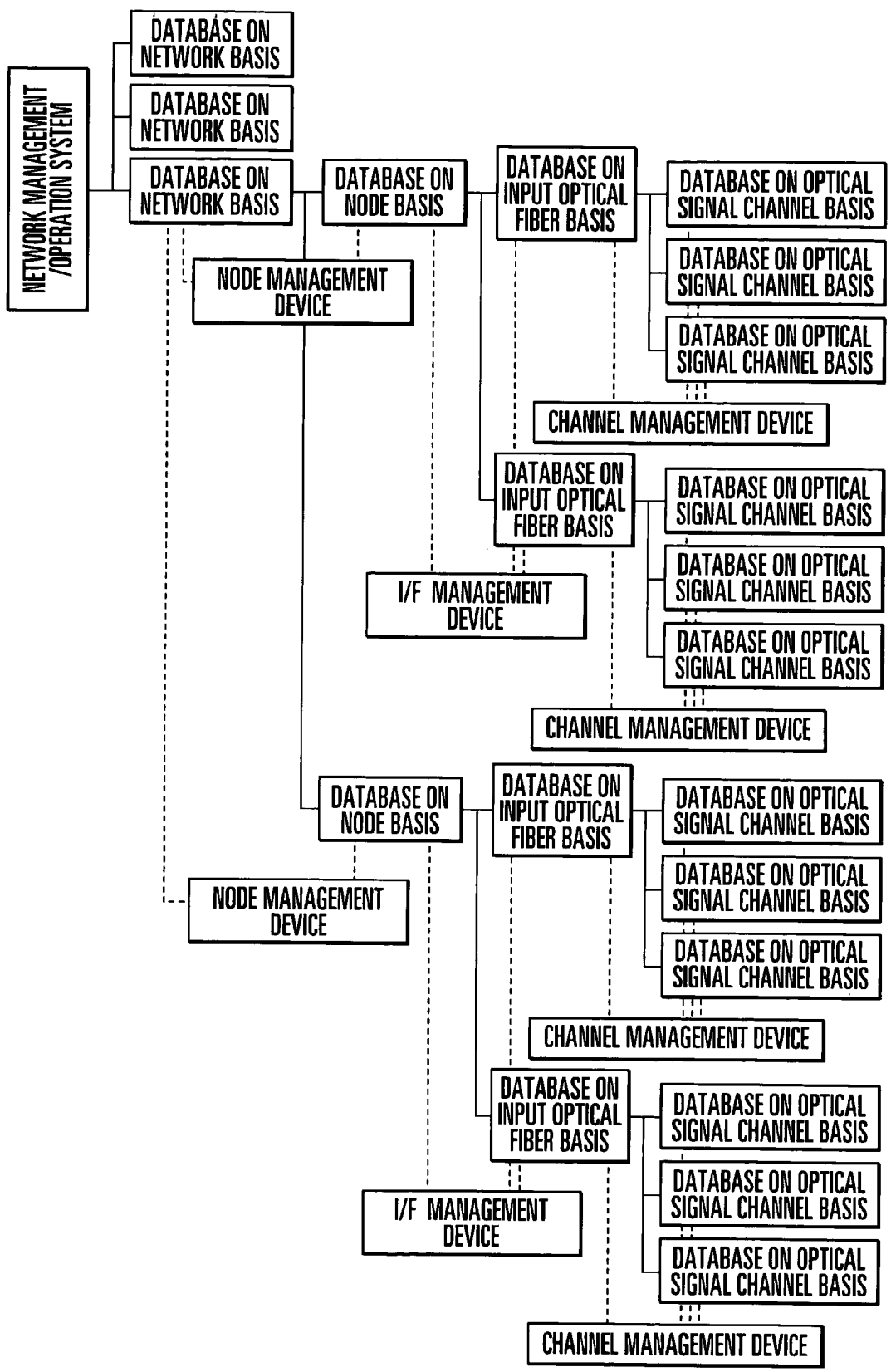
F I G. 6

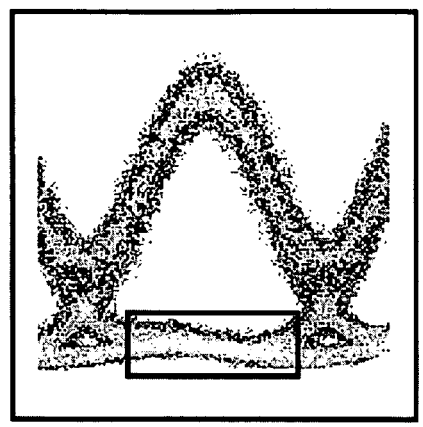
F I G. 22
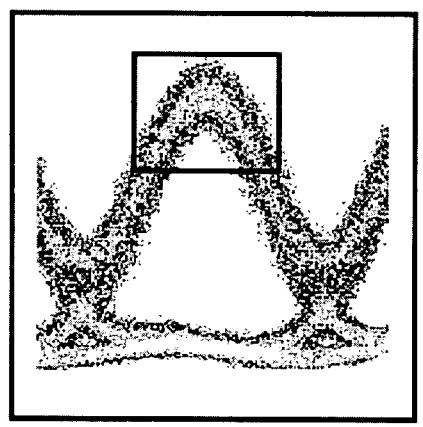
F I G. 23
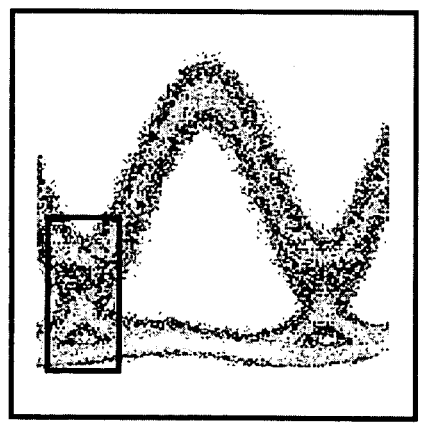
F I G. 24

OPTICAL SIGNAL MONITORING METHOD AND APPARATUS

BACKGROUND OF THE INVENTION

The present invention relates to an optical signal monitoring method and apparatus in wavelength multiplexing and an optical network and, more particularly, to an optical signal monitoring apparatus which performs monitoring operation with excellent feature expandability independently of the transmission rate and format of a main optical signal with an inexpensive apparatus arrangement.

Conventionally, for example, a network management/operation information acquisition means has used a method of monitoring signal quality by performing a parity check by adding a standardized overhead information bit into a transmission frame in a new synchronous network and measuring a code error rate.

A wavelength multiplexing technique as a large-volume information transmission technique can accommodate different transmission rates and formats on a wavelength basis, and can perform flexible information multiplexing.

In consideration of network management/operation, however, the use of a method dependent on the current transmission formats requires different network management/operation methods for different transmission formats. This leads to complexity of network management/operation and an increase in cost.

Demands therefore arise for techniques of acquiring network management/operation information independently of the transmission format. For example, such techniques include:

(1) a method of adding a standardized overhead information bit into a transmission frame as in a new synchronous network (see "Photonic Transport Network Architecture Employing Optical Path Concept", Kimio Oguchi and et al., ICC' 97 workshop, Jun. 8-12 (1997));

(2) a method of obtaining a Q value from the intensity distribution histogram of the marks/spaces of a received signal (see Japanese Patent Laid-Open No. 11-223575);

(3) a method of monitoring the quality of a main signal by subcarrier-multiplexing a monitor channel with the main signal and monitoring the code error rate of the monitor channel (see "Control modulation technique for client independent optical performance monitoring and transport of channel overhead", TuE2, OFC (2002)); and (4) a method of monitoring code errors by setting a plurality of identification points with respect to a received signal and computing the exclusive OR of the identification results (see Japanese Patent Laid-Open No. 2000-004260).

The above conventional techniques, however, have the following problems.

In method (1), the apparatus cost increases, and the utilization efficiency of a transmission path decreases.

The reason for this is that an optical signal is monitored by defining a new frame format and setting a monitor bit in its frame overhead. Consider, for example, an optical signal having wavelengths 1, 2, 3, and 4 multiplexed. Assume that an OC-192 signal in a synchronous network is accommodated in wavelength 1; a Gigabit Ethernet (trademark) (to be referred to as GbE hereinafter) signal, in wavelength 2; a Fiber Channel (to be referred to as FC) signal, in wavelength 3; and an ATM (Asynchronous Transfer Mode) signal, in wavelength 4. In this case, the formats of the OC-192, GbE, FC, and ATM signals accommodated in wavelengths 1 to 4 must be converted into the signal formats defined in method (1). In this case, a total of four types of format conversions are required. Therefore, a device having a format conversion function must be prepared for a transmission/reception device which handles such a plurality of formats, resulting in an increase in apparatus cost. In addition, since monitor and management frame overheads are added in format conversions, the utilization efficiency of a transmission path decreases as compared with a case wherein no format conversion is performed.

When a quality deterioration occurs in methods (2) and (4), a deterioration factor cannot be specified.

The reason for this is that these methods are configured to monitor only a bit code error rate (the probability or the number of times that a mark is mistaken for a space), i.e., the probability or the number of times that a space is mistaken for a mark. In addition, quality deterioration factors of an optical signal include, for example, light noise added by an optical amplifier and the wavelength dispersion characteristics of an optical fiber. These factors cause code errors at the time of reception of an optical signal. If such a signal deterioration factor can be specified, the transmission characteristics can be improved by taking appropriate measures. If, for example, it is known that a quality deterioration has been caused by wavelength dispersion, the code error rate at the time of reception of an optical signal can be reduced by installing a wavelength dispersion compensator (Japanese Patent Laid-Open No. 11-68657) on the input stage of an optical signal receiver.

In method (3), the transmission performance of a main signal deteriorates, and the apparatus cost increases.

The reason for this is that when a monitor signal is superimposed on a main signal, the superimposed monitor signal affects the main signal to result in a deterioration in the transmission performance of the main signal. In addition, this method requires a device for demultiplexing/multiplexing a monitor signal and main signal in addition to a monitoring apparatus. This leads to increases in apparatus cost and size.

SUMMARY OF THE INVENTION

The present invention has therefore been made in consideration of the above problems, and has as its object to provide a technique of extracting a characteristic feature by comparing the eye pattern of a received optical signal or a received eye pattern with an ideal eye pattern, specifying a deterioration factor and deterioration amount of the optical signal, and allowing the obtained optical signal quality information (deterioration factor and deterioration amount) to be used as control information for controlling a waveform deterioration compensator or the like and management/operation information for managing/operating a network, in order to provide an optical signal monitoring function and optical signal transmission function for wavelength multiplexing and an optical network at low cost without any limitations on a transmission signal format and rate.

In order to achieve the above object, according to the present invention, there is provided an optical signal monitoring method in wavelength multiplexing and an optical network, comprising the step of extracting an area corresponding to a characteristic pattern of an eye pattern of an optical signal to be monitored, which characterizes a deterioration, from a database storing a map which associates a quality deterioration factor and deterioration amount of the optical signal with the characteristic pattern of the area of the eye pattern of the optical signal, and the step of collating the extracted pattern with the map stored in the database to monitor the quality deterioration factor and deterioration amount of the optical signal, an occurrence time of a deterioration, duration of a deterioration, a deterioration occurrence cycle, and a deterioration duration cycle.

BRIEF DESCRIPTION OF THE DRAWINGS

FIG. 6 is a view showing the hierarchical relationship in a database;

FIG. 22 is a view showing a space portion as a characteristic pattern;

FIG. 23 is a view showing a mark portion as a characteristic pattern;

FIG. 24 is a view showing a cross point as a characteristic pattern;

DESCRIPTION OF THE PREFERRED EMBODIMENTS

The present invention can acquire the eye pattern of an optical signal to be monitored, extract a characteristic feature from the eye pattern itself or comparative data with a known ideal eye pattern, and monitor the quality of a received optical signal in accordance with a known correspondence map that associates the characteristic feature with an optical signal deterioration factor and a deterioration amount.

In addition, the present invention can use information about optical signal quality, e.g., an obtained optical signal deterioration factor and deterioration amount, as control information for controlling a waveform distortion compensator or the like or management/operation information for managing/operating a network.

The present invention performs monitoring operation without superimposing any additional overhead bit or channel on a main signal, and hence requires no device other than a monitoring apparatus, e.g., a multiplexing/demultiplexing device for additional bits and channels. Therefore, a low-cost, compact optical transmission apparatus can be realized.

First Embodiment

An embodiment of the present invention will be described in detail with reference to FIG. 1.

Figure 1:
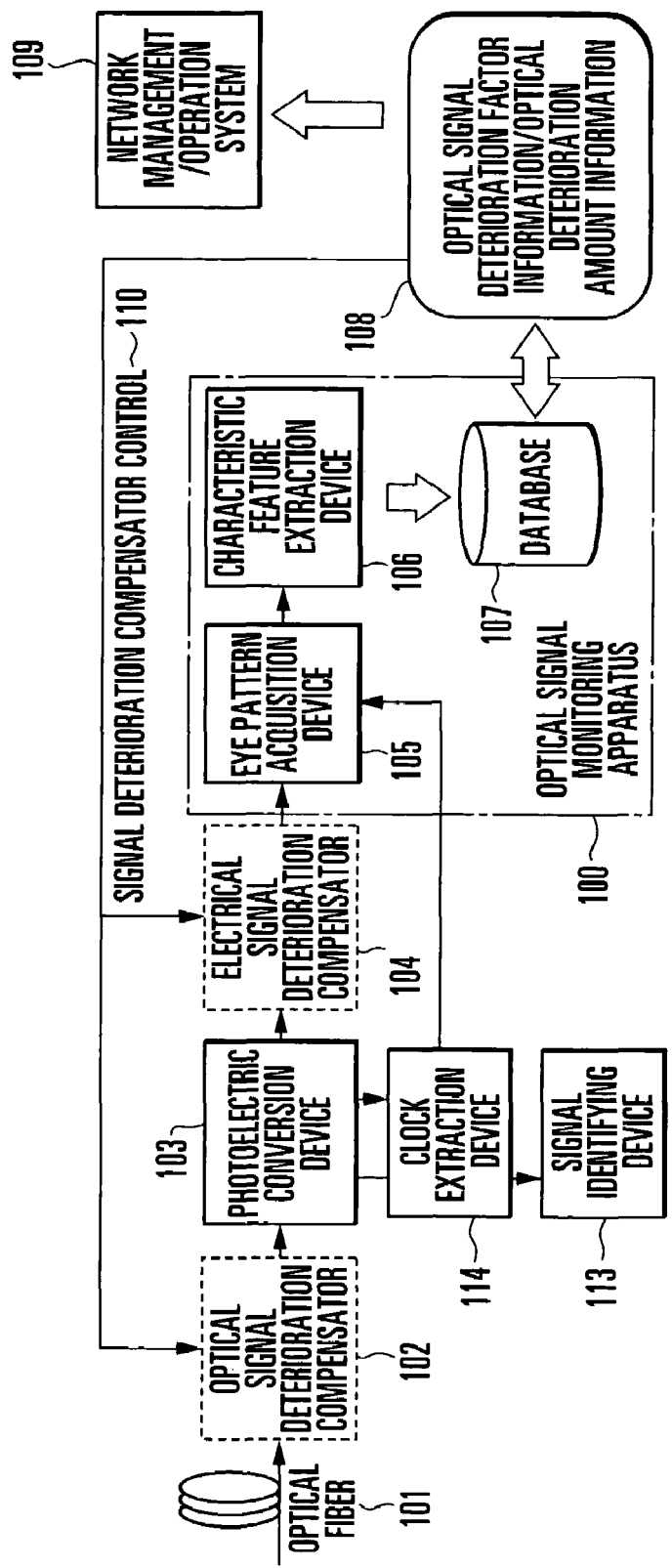
FIG. 1 is a block diagram showing an embodiment of the present invention.

Referring to FIG. 1, a photoelectric conversion device 103 converts an optical signal input from an optical fiber 101 into an electrical signal, and sends the resultant signal to an optical signal monitoring apparatus 100, clock extraction device 114, and signal identifying device 113.

The optical signal monitoring apparatus 100 acquires an eye pattern from the electrical signal input from the photoelectric conversion device 103 by using an eye pattern acquisition device 105. The obtained eye pattern of the optical signal input to the photoelectric conversion device 103 is guided to a characteristic feature extraction device 106.

A pattern representing the characteristic feature of the eye pattern used by the characteristic feature extraction device 106 is stored in a database 107 in advance. The pattern representing the characteristic feature of the eye pattern is an eye pattern itself obtained when an optical signal waveform is deformed by a waveform deterioration factor such as accumulated wavelength dispersion or the pattern of the deformed portion of the waveform.

The characteristic feature extraction device 106 extracts a characteristic feature from the eye pattern itself acquired by the eye pattern acquisition device 105 or the computation result of the eye pattern acquired by the eye pattern acquisition device 105 and a pattern representing the characteristic feature of the eye pattern which is stored in the database 107. The relationship between the acquired eye pattern or computation result, a waveform deterioration factor, and a deterioration amount is also stored in the database 107. Therefore, the waveform deterioration factor and deterioration amount of the optical signal received by the photoelectric conversion device 103 can be known by collating the acquired eye pattern itself or computation result with the database 107. If this collation is performed for each deterioration factor, pluralities of waveform deterioration factors and deterioration amounts can be monitored with the same arrangement. That is, the use of the optical signal monitoring apparatus 100 makes it possible to monitor, with a single arrangement, pluralities of quality deterioration factors and deterioration amounts 108 of an optical signal received by the photoelectric conversion device 103.

Optical signal transmission characteristics can be improved by providing an optical signal deterioration compensator 102 on the input stage of the photoelectric conversion device 103, and an electrical signal deterioration compensator 104 on the output stage of the photoelectric conversion device 103, and feeding back the monitor information 108 as control information. In addition, notifying a network management/operation system 109 of the monitor information 108 allows the use of the monitor information 108 as network management/operation information.

The operation of the optical signal quality monitoring apparatus having the above arrangement will be described next with reference to FIG. 1 and FIGS. 8 to 21.

Assume that a signal deterioration factor is accumulated wavelength dispersion. Referring to FIG. 1, the eye pattern acquisition device 105 (a) acquires the eye pattern of a monitor signal from an optical signal converted from an electrical signal by the photoelectric conversion device 103.

The photoelectric conversion device 103 supplies, to the clock extraction device 114 and signal identifying device 113, the same electrical signal as that output to the eye pattern acquisition device 105. The clock extraction device 114 extracts a clock from the electrical signal supplied from the photoelectric conversion device 103, and supplies the clock to the eye pattern acquisition device 105. The signal identifying device 113 identifies a mark and space for each signal bit from the analog electrical signal supplied from the photoelectric conversion device 103, thereby converting the signal into a digital signal.

Figure 8:
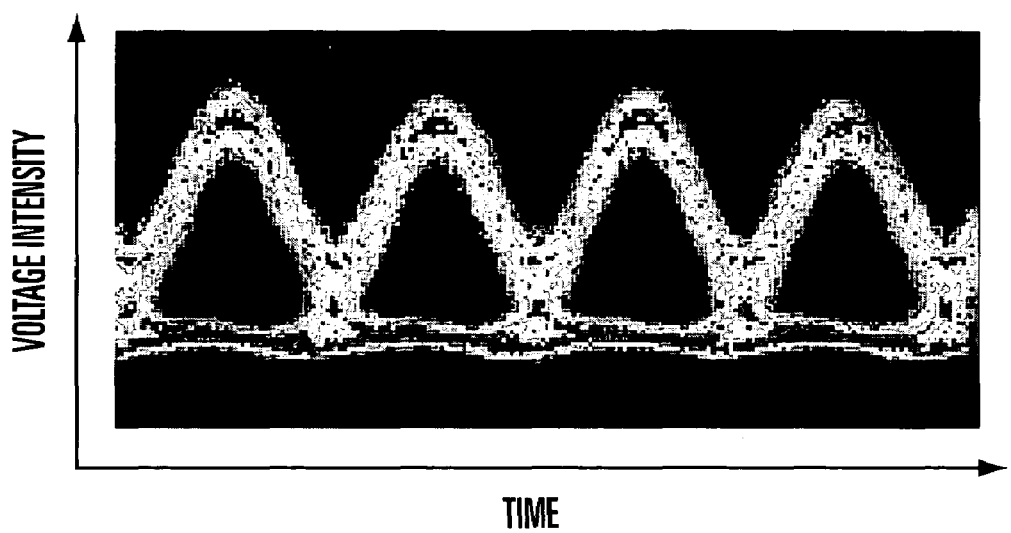
FIG. 8 is a graph showing an ideal eye pattern.
Figure 9:
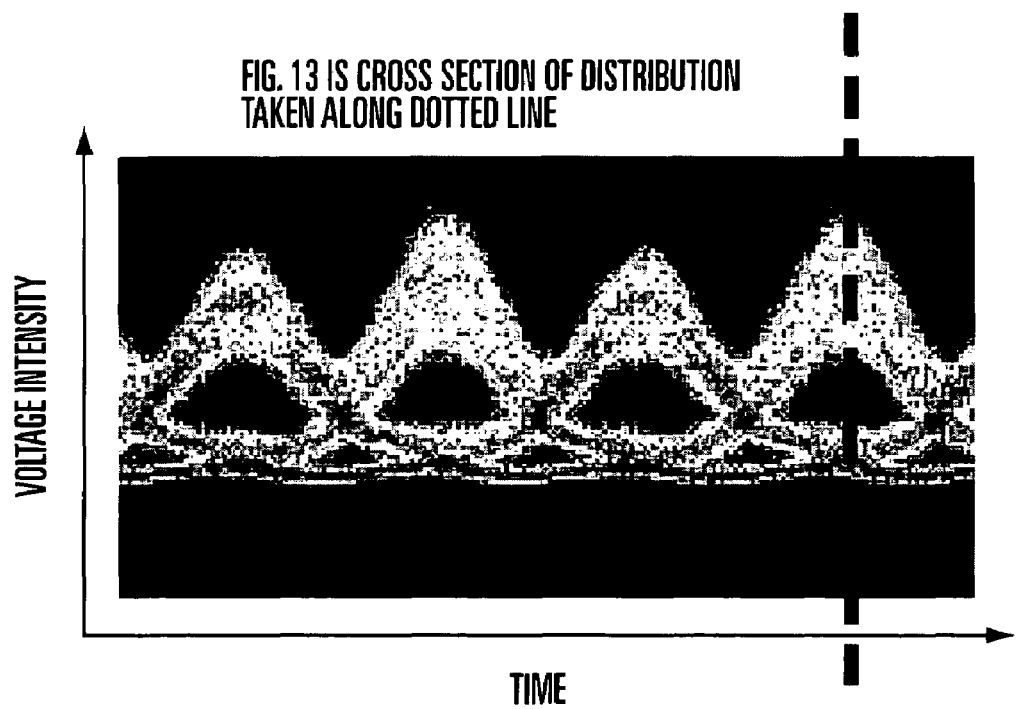
FIG. 9 is a graph showing an eye pattern which has deteriorated due to accumulated wavelength dispersion.

FIG. 8 shows an ideal eye pattern. FIG. 9 shows an eye pattern that has deteriorated due to accumulated wavelength dispersion.

(b) The characteristic feature extraction device 106 extracts characteristic information from the acquired pattern.

Figure 10:
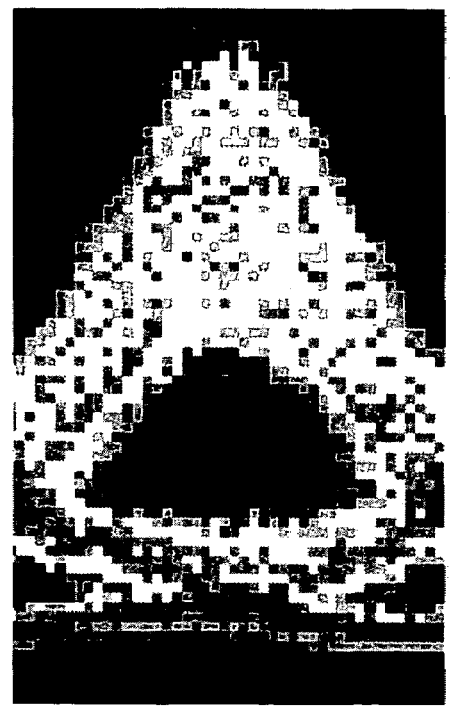
FIG. 10 is a graph showing a pattern extracted as a characteristic feature of a waveform deterioration due to accumulated wavelength dispersion.

FIG. 10 shows a pattern extracted as the characteristic feature of a waveform deterioration due to accumulated wavelength dispersion. In this case, it is necessary to determine in advance that the pattern shown in FIG. 10 is used as a correspondence between the waveform deterioration factor and the pattern to be extracted, i.e., the characteristic feature of the waveform deterioration due to accumulated wavelength dispersion. The database 107 stores various patterns corresponding to the pattern shown in FIG. 10 when the accumulated wavelength dispersion amount changes.

Figure 11:
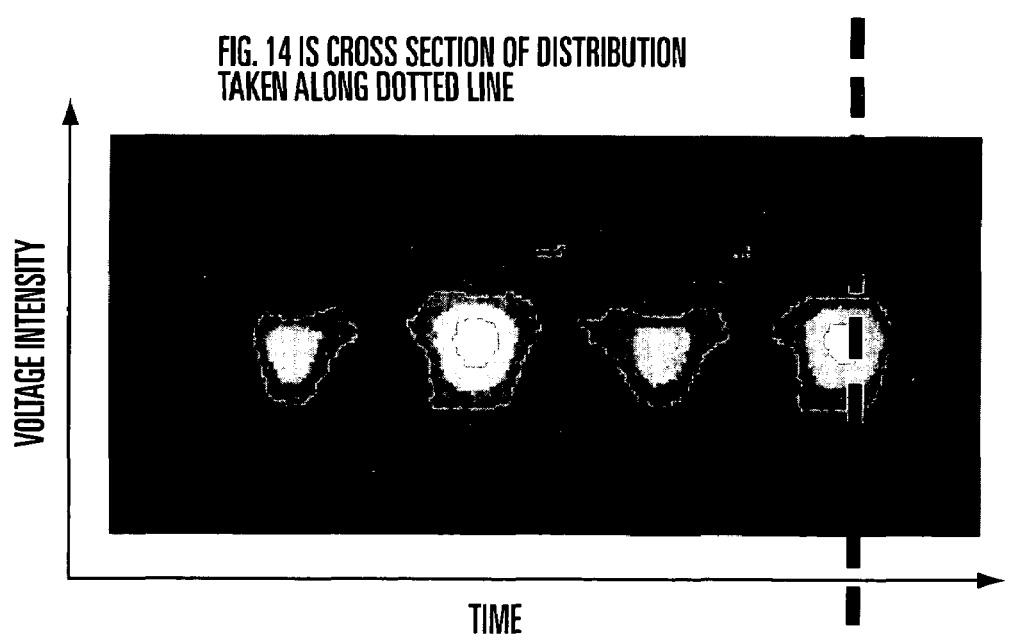
FIG. 11 is a graph showing a pattern obtained as a result of performing cross-correlation computation.
Figure 12:
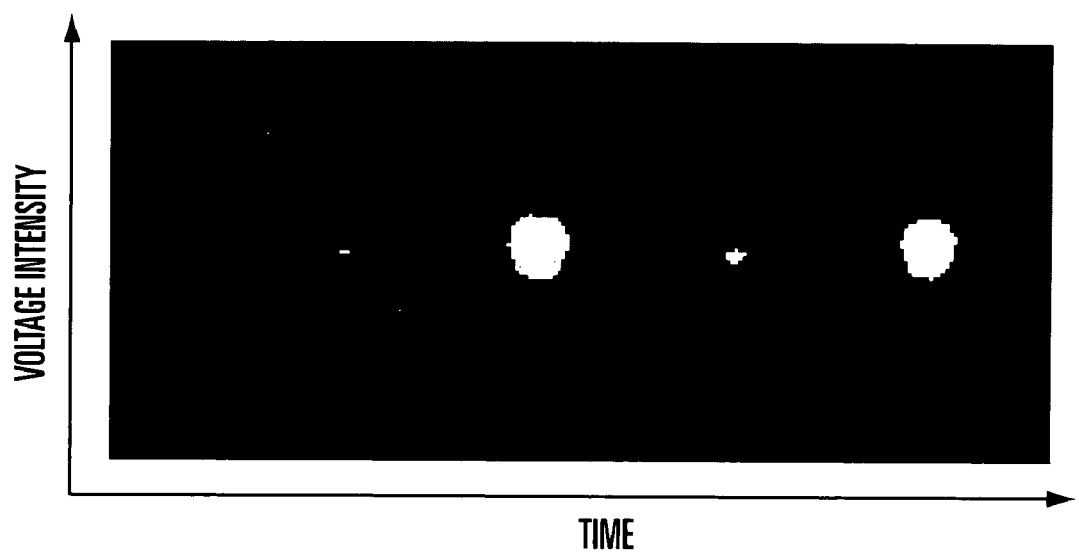
FIG. 12 is a graph showing a pattern obtained by setting an intensity threshold for a computation pattern and extracting a distribution equal to or higher than the threshold.
Figure 13:
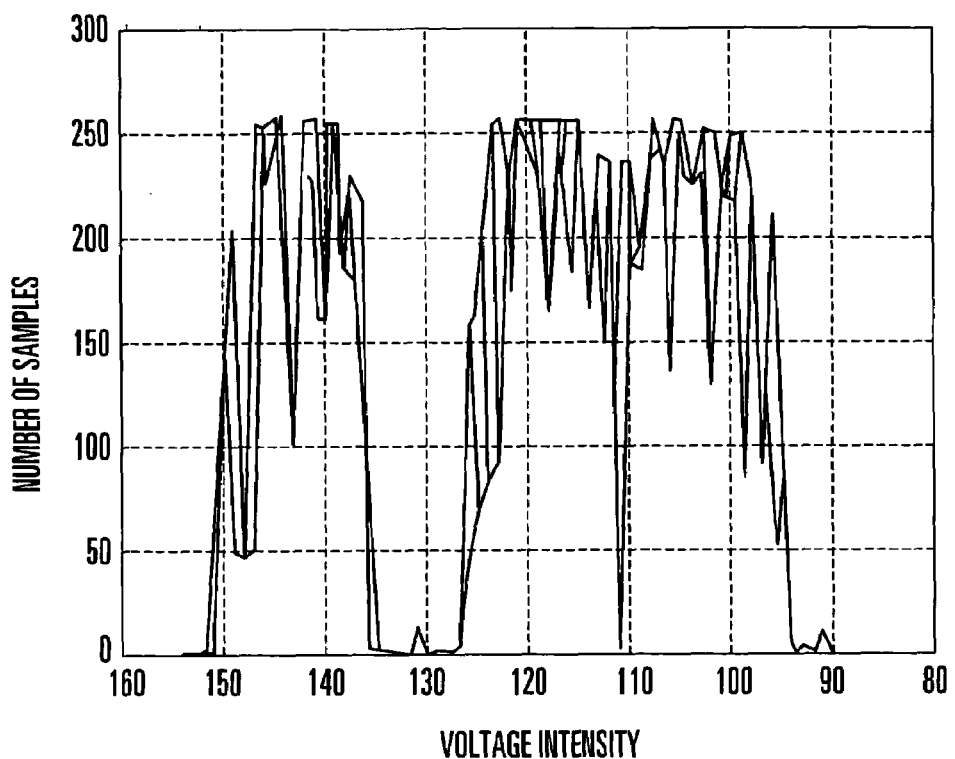
FIG. 13 is a graph showing a two-dimensional distribution.
Figure 14:
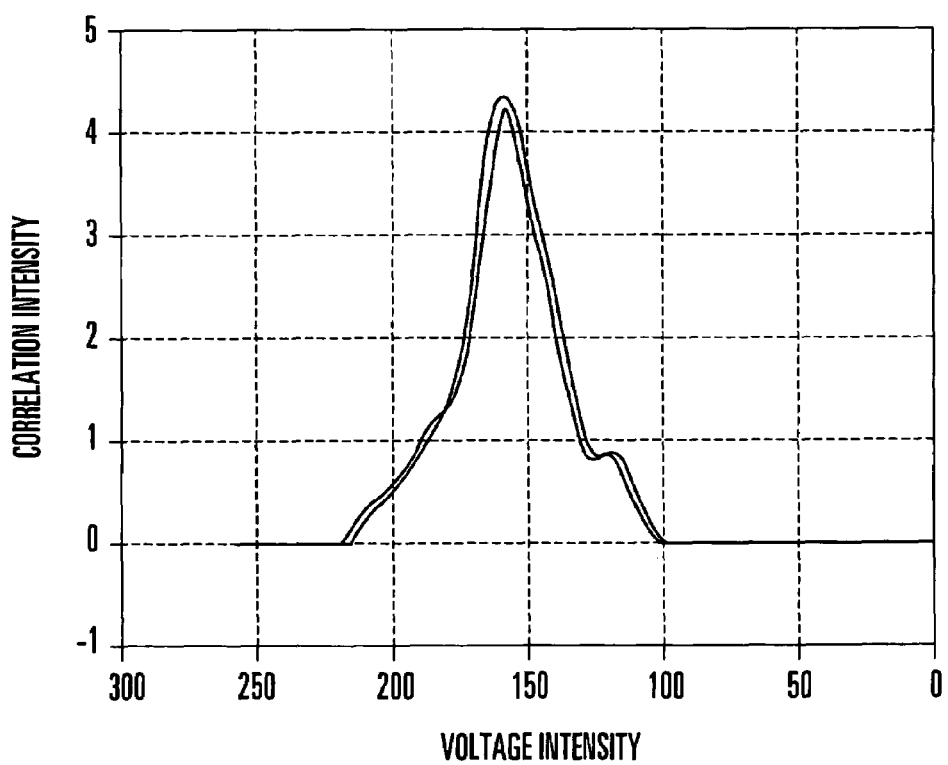
FIG. 14 is a graph showing a two-dimensional distribution.

The characteristic feature extraction device 106 performs computation between the characteristic pattern of the waveform deterioration due to accumulated wavelength dispersion in FIG. 10 and characteristic patterns which are similar to the pattern in FIG. 10 and correspond to various accumulated wavelength dispersion amounts stored in the database 107. FIG. 11 shows one of the computation results, which is a pattern obtained as the result of cross-correlation computation between the pattern in FIG. 8 and the pattern in FIG. 9. The computation in this case is not limited to the cross-correlation computation method, and other computation methods may be used. A correlation intensity peak value can be obtained from the pattern in FIG. 11. This correlation intensity peak value increases with an increase in similarity between the eye pattern which is being monitored and waveform deterioration patterns due to accumulated wavelength dispersion which are stored in the database 107. If, therefore, the respective accumulated wavelength dispersion amounts corresponding to the waveform deterioration patterns stored in the database 107 are known in advance, the accumulated wavelength dispersion amount contained in the eye pattern which is being monitored, i.e., the optical signal, can be known.

Figure 15:
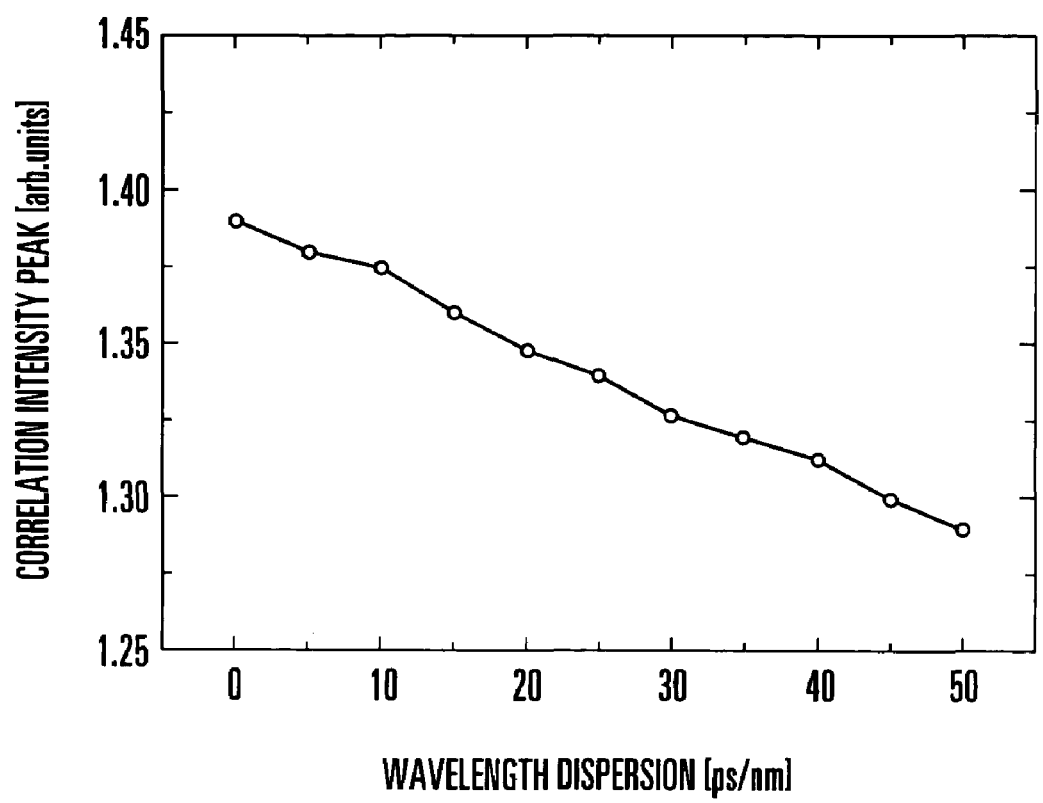
FIG. 15 is a graph showing the relationship between the accumulated wavelength dispersion amount and the correlation intensity peak.

The relationship between the waveform deterioration patterns stored in the database 107 and the accumulated wavelength dispersion amounts can be known by measurement in advance. The relationship between the accumulated wavelength dispersion amounts and the correlation intensity peaks is obtained as shown in FIG. 15. Even when an eye pattern having a waveform deterioration pattern due to accumulated wavelength dispersion which is not registered in the database 107 is monitored, the accumulated wavelength dispersion amount contained in the optical signal can be known. That is, the deterioration amount of the optical signal to be monitored can be known. In this case, a correlation intensity peak is used as extracted information. However, extracted information is not limited to a correlation intensity peak. More specifically, another numerical value, the radius or ellipticity of a pattern obtained by setting an intensity threshold for a computation pattern (FIG. 11) and extracting a distribution equal to or more than the threshold, or the standard deviation or average value of a two-dimensional distribution (FIG. 13 or 14) like an intensity distribution on the pattern in FIG. 9 or 11 at a given time may be used.

In addition, these values can be used in combination.

(c) Consider a factor other than an accumulated wavelength dispersion amount as a signal quality deterioration factor.

Figure 16:
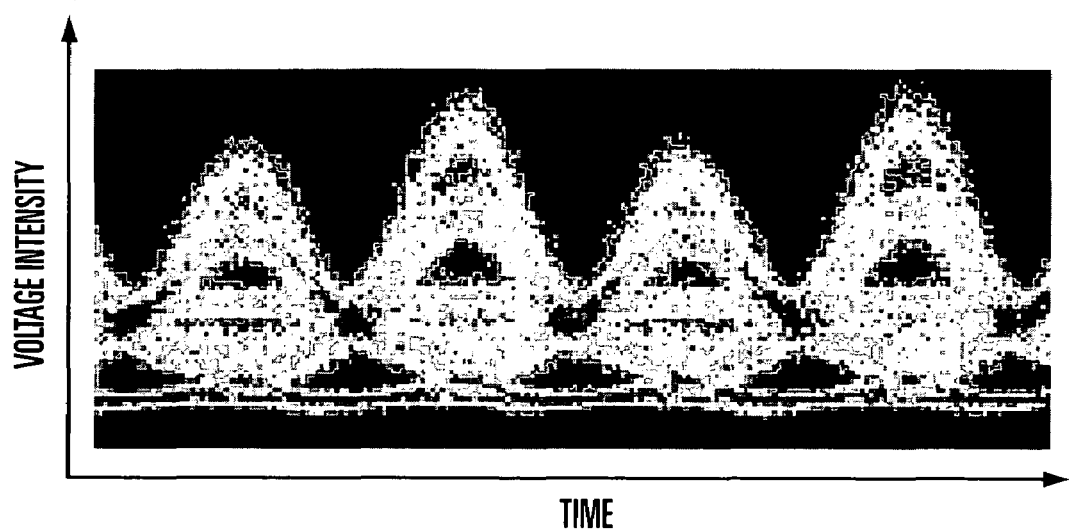
FIG. 16 is a graph showing an eye pattern which has deteriorated due to polarization mode dispersion.
Figure 17:
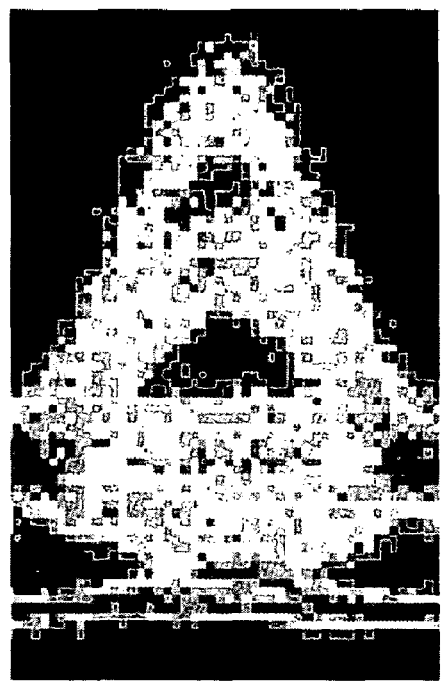
FIG. 17 is a view showing a pattern extracted as a characteristic feature of a waveform deterioration.
Figure 18:
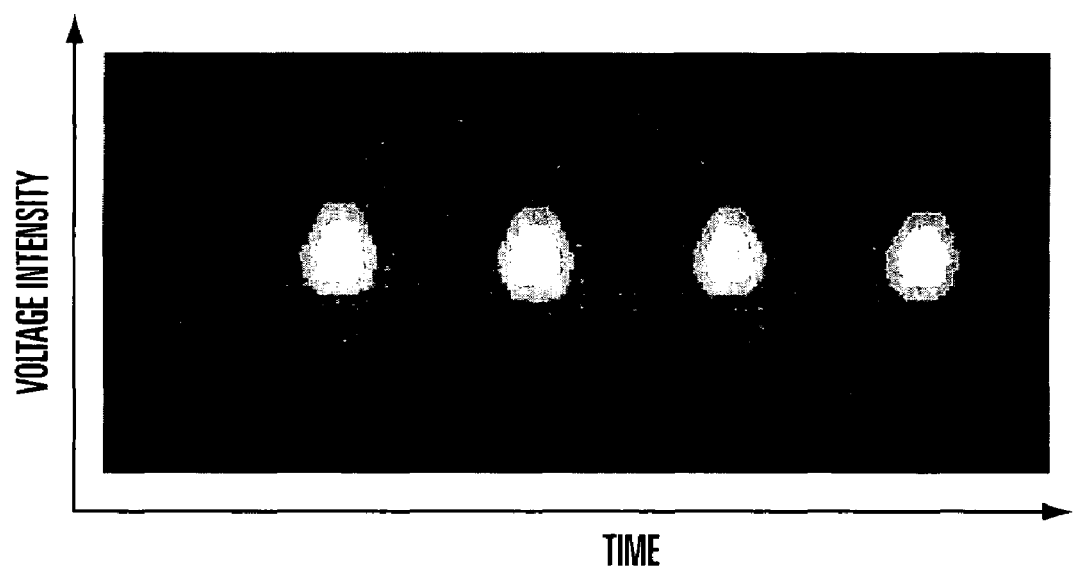
FIG. 18 is a graph showing a pattern obtained as a result of performing cross-correlation computation.
Figure 19:
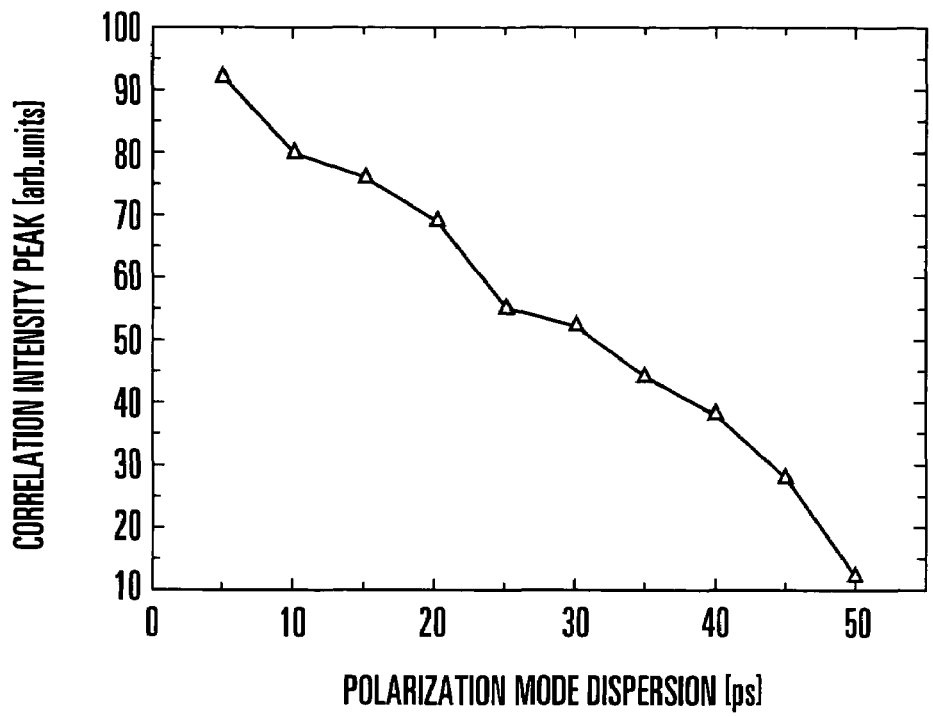
FIG. 19 is a graph showing the relationship between the polarization mode dispersion amount and the intensity peak value.

FIG. 16 shows an eye pattern which has deteriorated due to polarization mode dispersion. A pattern like that shown in FIG. 18 is obtained as a characteristic feature extracted from the pattern in FIG. 16 by selecting a characteristic feature different from that in FIG. 10 as shown in FIG. 17 and performing computation similar to that for accumulated wavelength dispersion. FIG. 19 shows a pattern obtained by using an intensity peak value as a characteristic feature to be extracted and obtaining the relationship between the polarization mode dispersion amount and the intensity peak value as in the case of accumulated wavelength dispersion. Obviously, the patterns in FIG. 15 and FIG. 19 differ from each other.

Figure 20:
FIG. 20 is a graph showing a cross-correlation computation result on an eye pattern having undergone only accumulated wavelength dispersion as a waveform deterioration factor and a waveform deterioration pattern due to polarization mode dispersion.

FIG. 20 shows the computation result on the cross-correlation between an eye pattern (FIG. 9) representing a case wherein a waveform deterioration factor is only accumulated wavelength dispersion and the characteristic feature (FIG. 17) of a waveform deterioration pattern due to polarization mode dispersion.

Since there is hardly any similarity between the patterns in FIGS. 9 and 10, no correlation intensity peak like the one in FIG. 11 appears in FIG. 20. This indicates that the deterioration factor of the optical signal which is being monitored is not polarization mode dispersion but is accumulated wavelength dispersion, and hence allows an appropriate comprehension of the state of the eye pattern in FIG. 9.

Figure 21:
FIG. 21 is a graph showing a cross-correlation computation result on an eye pattern having undergone only polarization mode dispersion as a waveform deterioration factor and a waveform deterioration pattern due to accumulated wavelength dispersion.

FIG. 21 shows the computation result on the cross-correlation between an eye pattern (FIG. 16) representing a case wherein a waveform deterioration factor is only polarization mode dispersion and the characteristic feature (FIG. 10) of a waveform deterioration pattern due to accumulated wavelength dispersion. Since there is hardly any similarity between the patterns in FIGS. 16 and 10, no correlation intensity peak like the one in FIG. 11 appears in FIG. 21. This indicates that the deterioration factor of the optical signal which is being monitored is not accumulated wavelength dispersion but is polarization mode dispersion, and hence allows an appropriate comprehension of the state of the eye pattern in FIG. 16. A waveform deterioration factor can therefore be specified by changing the pattern to be compared with the eye pattern of an optical signal. That is, the deterioration factor of an optical signal to be monitored can be known. The types of deterioration factors that can be specified depend on the kinds of patterns (corresponding to the patterns in FIGS. 10 and 17 in this case) which characterize deterioration factors and are stored in the database 107 in advance. Consequently, as the amount of information registered in the database 107 increases, the types of deterioration factors that can be specified increase in number, and the specifying precision improves. Deterioration factors need not be limited to accumulated wavelength dispersion and polarization mode dispersion, and may include, for example, the S/N ratio of light, SPM (Self Phase Modulation), XPM (Cross Phase Modulation), FWM (Four Wave Mixing), and optical fiber end face reflection. It suffices if the characteristic patterns of waveform deterioration and the relationships between the patterns and the deterioration amounts are registered in the database 107 in correspondence with the respective deterioration factors as in the above cases of accumulated wavelength dispersion and polarization mode dispersion.

Figure 4:
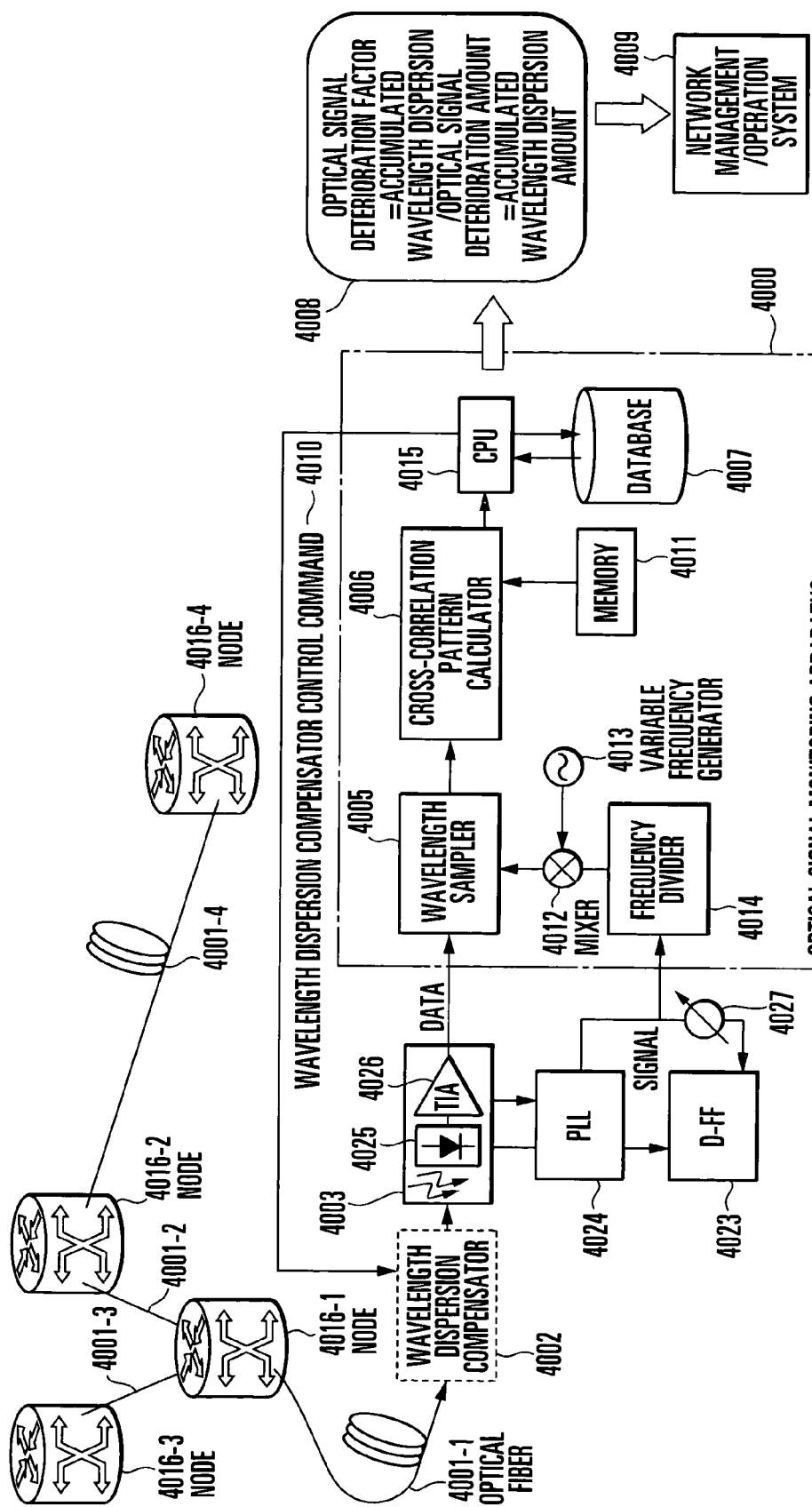
FIG. 4 is a block diagram showing the embodiment of the present invention.

FIG. 4 shows an embodiment based on the assumption that wavelength dispersion is an optical signal deterioration factor.

Referring to FIG. 4, a wavelength dispersion compensator 4002 is used as an optical signal deterioration compensator; a light-receiving circuit 4003 constituted by a PIN-photodiode (to be referred to as a PIN-PD hereinafter) 4025 and a trans impedance amplifier (to be referred to as a TIA hereinafter) 4026, as a photoelectric conversion device; a wavelength sampler 4005, as an eye pattern acquisition device; a cross-correlation pattern calculator 4006, as a characteristic feature extraction device; wavelength dispersion compensator control 4010, as signal deterioration compensator control; a phase locked loop (to be referred to as a PLL hereinafter) 4024, as a clock extraction device; and a D-flip-flop (to be referred to as a D-FF hereinafter) 4023, as a signal identifying device. The light-receiving circuit 4003 photoelectrically converts an optical signal input from an optical fiber 4001, and sends the resultant analog data to the wavelength sampler 4005, PLL 4024, and D-FF 4023. The light-receiving circuit 4003 also supplies, to the PLL 4024 and D-FF 4023, the same electrical signal as that output to the wavelength sampler 4005. The PLL 4024 extracts a clock f from the electrical signal supplied from the light-receiving circuit 4003, and supplies the clock to the frequency divider 4014 and D-FF 4023.

The D-FF 4023 identifies a mark and space for each signal bit from the analog electrical signal supplied from the light-receiving circuit 4003 and the reproduction clock subjected to clock phase adjustment by a phase adjusting unit 4027, thereby converting the signal into a digital signal. A mixer 4012 adds a clock $\Delta f$ generated by a variable frequency generator 4013 to a clock f/N obtained by a frequency divider 4014 by 1/N frequency-dividing the clock f, thereby obtaining a clock given by $f'=f+\Delta f$. The wavelength sampler 4005 samples the input analog signal with the clock f'. An ideal eye pattern free from deterioration due to wavelength dispersion is registered in a memory 4011. The cross-correlation pattern calculator 4006 computes a cross-correlation pattern from the eye pattern acquired by the wavelength sampler 4005 and the ideal eye pattern stored in the memory 4011. The cross-correlation pattern computation result is transferred to a CPU 4015 to extract a characteristic pattern. The correspondence map of characteristic patterns obtained in advance by measurement and optical signal deterioration factors is stored in a database 4007.

The CPU 4015 specifies accumulated wavelength dispersion as a signal deterioration factor from the correspondence map, and also specifies the accumulated wavelength dispersion amount. The CPU 4015 then obtains the accumulated wavelength dispersion amount contained in the optical signal input to the light-receiving circuit 4003. The CPU 4015 notifies a network management/operation system 4009 of accumulated wavelength dispersion which is an optical signal deterioration factor and its amount as information 4008. The network management/operation system can measure the qualities of services to be provided for customers by using the information 4008 as an information communication path management/operation information source at the optical signal level. In addition, upon specifying the information 4008, the CPU 4015 issues the control command 4010 for compensating for the signal deterioration to the wavelength dispersion compensator 4002.

The wavelength dispersion compensator 4002 performs wavelength dispersion compensation for the optical signal input from the optical fiber 4001 by the amount designated by the CPU 4015.

The operation of the optical signal quality monitoring apparatus in FIG. 4 will be described next.

FIG. 4 shows an embodiment based on the assumption that wavelength dispersion is an optical signal deterioration factor. The light-receiving circuit 4003 photoelectrically converts an optical signal input from the optical fiber 4001, and sends the analog signal data to the wavelength sampler 4005, PLL 4024, and D-FF 4023. The light-receiving circuit 4003 also supplies, to the PLL 4024 and D-FF 4023, the same electrical signal as that output to the wavelength sampler 4005. The electrical signal supplied in this case is an analog signal containing waveform deterioration information due to optical transmission.

The PLL 4024 extracts the clock f from the electrical signal supplied from the light-receiving circuit 4003, and supplies the clock to the frequency divider 4014.

The D-FF 4023 identifies a mark and space for each signal bit from the analog electrical signal supplied from the light-receiving circuit 4003, and converts the analog signal into a digital signal. The digitized signal is subjected as a reception signal to processing such as multiplexing/demultiplexing, and the resultant signal is converted into an optical signal again to be transferred to another node or distributed to the user connected to the self node. The mixer 4012 adds a clock $\Delta f$ generated by the variable frequency generator 4013 to a clock f/N obtained by the frequency divider 4014 by 1/N frequency-dividing the clock f, thereby obtaining a clock given by $f'=f+\Delta f$. The waveform sampler 4005 samples the input analog signal with the clock f' to acquire an eye pattern, at a sampling period of $\Delta f$, which is temporally extended by N times with respect to the input signal. Using a clock obtained by frequency division instead of the frequency of an input signal eliminates the necessity to change the apparatus arrangement even when the input signal rate changes. Since the sampling period $\Delta f$ can be adjusted by the variable frequency generator 4013, the eye pattern acquisition speed can also be adjusted. This makes it possible to flexibly acquire eye patterns with respect to input signals.

An ideal eye pattern without any deterioration due to wavelength dispersion is registered in the memory 4011. As this eye pattern, measured data may be statically used. Alternatively, the eye pattern may be updated periodically or in accordance with a request by reading out the eye pattern acquired at the optical signal transmission source, thus dynamically using this data.

The cross-correlation pattern calculator 4006 computes a cross-correction pattern between the eye pattern acquired by the wavelength sampler 4005 and the ideal eye pattern stored in the memory 4011.

The cross-correlation pattern computation result is transferred to the CPU 4015 to extract a characteristic pattern therefrom. The correspondence map of characteristic patterns obtained in advance by measurement and optical signal deterioration factors is stored in the database 4007. The CPU 4015 specifies accumulated wavelength dispersion as a signal deterioration factor from the correspondence map, and also specifies the accumulated wavelength dispersion amount. The CPU 4015 then obtains the accumulated wavelength dispersion amount contained in the optical signal input to the light-receiving circuit 4003.

A method of obtaining an accumulated wavelength dispersion amount from the correspondence map of characteristic patterns and accumulated wavelength dispersion amounts, which is stored in the database, will be described below. FIG. 9 shows the eye pattern acquired by the wavelength sampler 4005. The eye pattern in FIG. 9 has deteriorated due to accumulated wavelength dispersion. FIG. 10 shows the pattern extracted by the CPU 4015 from the eye pattern in FIG. 9, which is obtained by the wavelength sampler 4005, as a characteristic feature of a waveform deterioration due to accumulated wavelength dispersion. In this case, it is necessary to determine in advance that the pattern shown in FIG. 10 is used as a correspondence between the waveform deterioration factor and the pattern to be extracted, i.e., the characteristic feature of the waveform deterioration due to accumulated wavelength dispersion. The database 4007 stores various patterns corresponding to the pattern shown in FIG. 10 when the accumulated wavelength dispersion amount changes, and the results obtained by the cross-correlation pattern calculator 4006 by computing cross-correlations between the patterns and the ideal eye patterns stored in the memory 4011.

The cross-correlation pattern calculator 4006 performs cross-correlation computation of the characteristic pattern (FIG. 10) of the waveform deterioration extracted from the eye pattern (FIG. 9) which is being monitored. FIG. 11 shows one of the cross-correlation computation results on an ideal eye pattern stored in the database 4007 and an eye pattern whose accumulated wavelength dispersion amount is changed. The computation in this case is not limited to cross-correlation computation, and another computation method may be used. A correlation intensity peak value can be obtained from the pattern in FIG. 11. This correlation intensity peak value increases with an increase in similarity between the eye pattern which is being monitored and waveform deterioration patterns due to accumulated wavelength dispersion which are stored in the database 4007. If, therefore, the respective accumulated wavelength dispersion amounts corresponding to the waveform deterioration patterns stored in the database 4007 are known in advance, the accumulated wavelength dispersion amount contained in the eye pattern which is being monitored, i.e., the optical signal, can be known. The relationship between the waveform deterioration patterns stored in the database 4007 and the accumulated wavelength dispersion amounts can be known by measurement in advance. The relationship between the accumulated wavelength dispersion amounts and the correlation intensity peaks is obtained as shown in FIG. 15. Even when an eye pattern having a waveform deterioration pattern due to accumulated wavelength dispersion which is not registered in the database 4007 is monitored, the accumulated wavelength dispersion amount contained in the optical signal can be known. That is, the deterioration amount of the optical signal to be monitored can be known from the correspondence map of characteristic patterns and accumulated wavelength dispersion amounts. In this case, a correlation intensity peak is used as extracted information. However, extracted information is not limited to a correlation intensity peak. More specifically, another numerical value, the radius or ellipticity of a pattern obtained by setting a intensity threshold for a computation pattern (FIG. 11) and extracting a distribution equal to or more than the threshold, or the standard deviation or average value of a two-dimensional distribution (FIG. 13 or 14) like an intensity distribution on the pattern in FIG. 9 or 11 at a given time may be used. In addition, these values can be used in combination.

Consider a factor other than an accumulated wavelength dispersion amount as a signal quality deterioration factor.

FIG. 16 shows an eye pattern which has deteriorated due to polarization mode dispersion. A pattern like that shown in FIG. 18 is obtained as a characteristic feature extracted from the pattern in FIG. 16 by selecting a characteristic feature different from that in FIG. 10 as shown in FIG. 17 and performing computation similar to that for accumulated wavelength dispersion. FIG. 19 shows a pattern obtained by using an intensity peak value as a characteristic feature to be extracted and obtaining the relationship between the polarization mode dispersion amount and the intensity peak value as in the case of accumulated wavelength dispersion. Obviously, the patterns in FIG. 15 and FIG. 19 differ from each other. FIG. 20 shows the computation result on the cross-correlation between an eye pattern (FIG. 9) representing a case wherein a waveform deterioration factor is only accumulated wavelength dispersion and the characteristic feature (FIG. 17) of a waveform deterioration pattern due to polarization mode dispersion. Since there is hardly any similarity between the patterns in FIGS. 9 and 17, no correlation intensity peak like the one in FIG. 11 appears in FIG. 20. This indicates that the deterioration factor of the optical signal which is being monitored is not polarization mode dispersion but is accumulated wavelength dispersion, and hence allows an appropriate comprehension of the state of the eye pattern in FIG. 9. FIG. 21 shows the computation result on the cross-correlation between an eye pattern (FIG. 16) representing a case wherein a waveform deterioration factor is only polarization mode dispersion and the characteristic feature (FIG. 10) of a waveform deterioration pattern due to accumulated wavelength dispersion. Since there is hardly any similarity between the patterns in FIGS. 16 and 10, no correlation intensity peak like the one in FIG. 11 appears in FIG. 21. This indicates that the deterioration factor of the optical signal which is being monitored is not accumulated wavelength dispersion but is polarization mode dispersion, and hence allows an appropriate comprehension of the state of the eye pattern in FIG. 16. That is, changing the pattern to be compared with the eye pattern of an optical signal makes it possible to know that a waveform deterioration factor is not polarization mode dispersion but is accumulated wavelength dispersion. Other deterioration factors can be discriminated in the same manner as described above.

Figure 5:
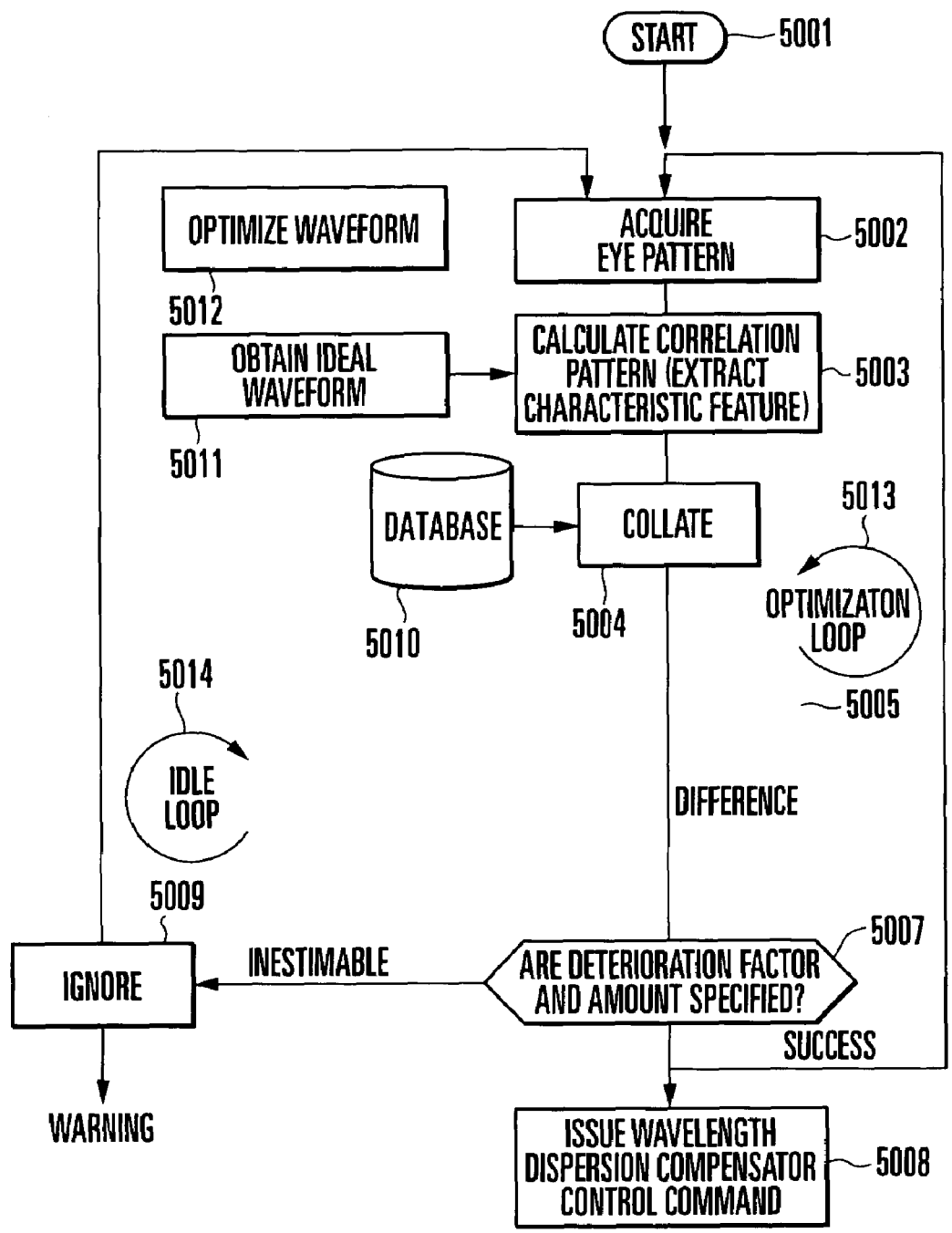
FIG. 5 is a flow chart showing control operation for a wavelength dispersion compensator.

A method of controlling the wavelength dispersion compensator by using the accumulated wavelength dispersion amount obtained in the above manner, i.e., the optical signal deterioration factor/deterioration amount information 4008, will be described next with reference to FIG. 5. Start 5001 represents a monitoring start timing. Eye pattern acquisition 5002 represents the acquisition of an eye pattern by the wavelength sampler 4005. Correlation pattern calculation 5003 represents that the cross-correlation pattern calculator 4006 performs cross-correlation computation of the eye pattern of a monitor signal and the ideal eye pattern registered in the memory 4011 in the above manner.

In collation 5004, the CPU 4015 collates the relationship between the correspondence map of the characteristic patterns and accumulated wavelength dispersion amounts, stored in the database 4007 (5010 in FIG. 5), and the correlation intensity peaks and accumulated wavelength dispersion amounts obtained from the map, shown in FIG. 15, with the correlation pattern and correlation intensity peak obtained in correlation pattern calculation 5003. In this case, the collation with the correlation pattern will indicate that a deterioration factor is accumulated wavelength dispersion, and the collation with the correlation intensity peak will specify an accumulated wavelength dispersion amount in step 5007. This operation is performed by the CPU 4015 in FIG. 4.

If specifying operation fails, the collation result is ignored, and the CPU 4015 causes idle loop 5014 to return to eye pattern acquisition 5002. Since the specifying operation has failed, the CPU 4015 issues a warning 5009 indicating that the collation result has been ignored. If the specifying operation has succeeded, the CPU 4015 tries to correct the obtained accumulated wavelength dispersion amount by issuing the wavelength dispersion compensator control command 4010 to the wavelength dispersion compensator 4002 in step 5008. At the same time, the CPU 4015 causes optimization loop 5013 to return to eye pattern acquisition 5002. The accumulated wavelength dispersion amount contained in the optical signal received by the light-receiving circuit 4003 varies due to variations in the environmental temperature of optical fibers 4001-1 to 4001-4 and changes in the characteristics of the overall optical fiber transmission path caused by a change of the optical signal transmission source. In this case, the changes in the characteristics of the overall optical fiber transmission path caused by the change of the optical signal transmission source indicate changes in characteristics caused when, for example, the transmission source which has been a node 4016-3 (state A) at time t1 switches to a node 4016-4 (state B) at time t2. When the transmission source is the node 4016-3, a transmission path is constituted by the optical fiber 4001-3, a node 4016-1, and the optical fiber 4001-1. When the transmission source is the node 4016-4, a transmission path is constituted by the optical fiber 4001-4, a node 4016-2, the optical fiber 4001-2, the node 4016-1, and the optical fiber 4001-1. Even if the nodes 4016-1 and 4016-2 and the optical fibers 4001-2 to 4001-4 have the same wavelength dispersion characteristics, the number of nodes and the length of optical fibers through which an optical signal passes at time t1 differ from those at time t2, the characteristics of the overall optical fiber transmission path change. In addition, if the nodes 4016-1 and 4016-2 and the optical fibers 4001-1 to 4001-4 have different wavelength dispersion characteristics, the characteristics of the overall optical fiber transmission path may greatly change. Obviously, the accumulated wavelength dispersion amount contained in the optical signal received by the light-receiving circuit 4003, i.e., the optical signal to be monitored, changes moment to moment. For this reason, the CPU 4015 monitors the accumulated wavelength dispersion amount in accordance with optimization loop 5013 to perform feedback control to allow the wavelength dispersion compensator 4002 to always perform optimal dispersion compensation. This makes it possible to track an optimal wavelength dispersion compensation amount.

The wavelength dispersion compensation amount set in the wavelength dispersion compensator 4002 when this optimal light reception environment is obtained is stored as management information in the database 4007 and network management/operation system 4009.

Assume that the wavelength dispersion compensation amount in the wavelength dispersion compensator 4002 in a state B is different from that in a state A, and a change has occurred again from the state A to the state B. In this case, the network management/operation system 4009 notifies an optical signal monitoring apparatus 4000 of the corresponding information. This makes it possible for the optical signal monitoring apparatus 4000 to perform optimization in a shorter period of time than in the previous operation, because the optimal settings for the wavelength dispersion compensator 4002 in the state A have already been stored in the optical signal monitoring apparatus 4000.

A method of notifying the network management/operation system 4009 of the optical signal deterioration factor/deterioration amount information 4008 and allowing the system to use it as network management/operation information will be described next.

When a service provider provides a user with a communication line, the provider may set an SLA (Service Level Agreement) and make a contract with the user (with regard to SLAs, see, for example, Ikuyo Yoshida, "Introduction to Latest ASP", published by Gijutsu Hyoron Sha, July, 2001, Section 9 in Chapter 6). If the service provider violates the SLA defined at the conclusion of the contract, the provider will make compensation for the violation, e.g., partly changing the communication line charge for the user in accordance with the contract. Assume that in FIG. 4, a service provider A manages/operates the nodes 4016-1, 4016-3, and 4016-4 and the optical fibers 4001-1 and 4001-3, and a service provider B manages/operates the node 4016-2 and the optical fibers 4001-2 and 4001-4. Assume also that a change of the optical signal transmission source, like that described above, has occurred, i.e., the source has switched from the node 4016-3 to the node 4016-4. Assume further that after the switching operation, the optical signal quality in the light-receiving circuit 4003 has deteriorated to result in a failure to normally perform receiving operation at a given time. At this time, the optical signal deterioration factor is accumulated wavelength dispersion in the optical signal monitoring apparatus 4000, and the deterioration amount, deterioration occurrence time, the duration of quality deterioration, and the like can be acquired. Therefore, for example, the following information can be obtained: the communication trouble has occurred after the switching of the optical signal transmission source; the trouble has occurred in the network managed/operated by the service provider B; and optical signal deterioration due to wavelength dispersion has occurred in a node or optical fiber managed/operated by the service provider B. Notifying the service providers A and B through the network management/operation system 4009 of these pieces of monitor information makes it possible to determine which provider will be under obligation to make compensation for the violation with respect to the user in accordance with the contents of the contract, and what degree of compensation is required.

In addition, the service provider B can know that the node 4016-2 or optical fiber 4001-2 has caused the deterioration in wavelength dispersion characteristics, and hence can obtain maintenance information for the replacement of a component of the node 4016-2 or the replacement or repair of the optical fiber 4001-2. Meanwhile, the service provider A can take measures to protect the quality of services which the provider provides, by refraining from connecting to the network managed/operated by the service provider B until the reliability of the network is restored. As is obvious from the above description, the optical signal monitor information 4008 can be used as network management/operation information.

Although this embodiment has been described by taking accumulated wavelength dispersion as an optical signal quality deterioration factor, deterioration factors need not be limited to accumulated wavelength dispersion, and may include, for example, the S/N ratio of light, SPM (Self Phase Modulation), XPM (Cross Phase Modulation), FWM (Four Wave Mixing), and optical fiber end face reflection.

Second Embodiment

The second embodiment of the present invention will be described.

Figure 2:
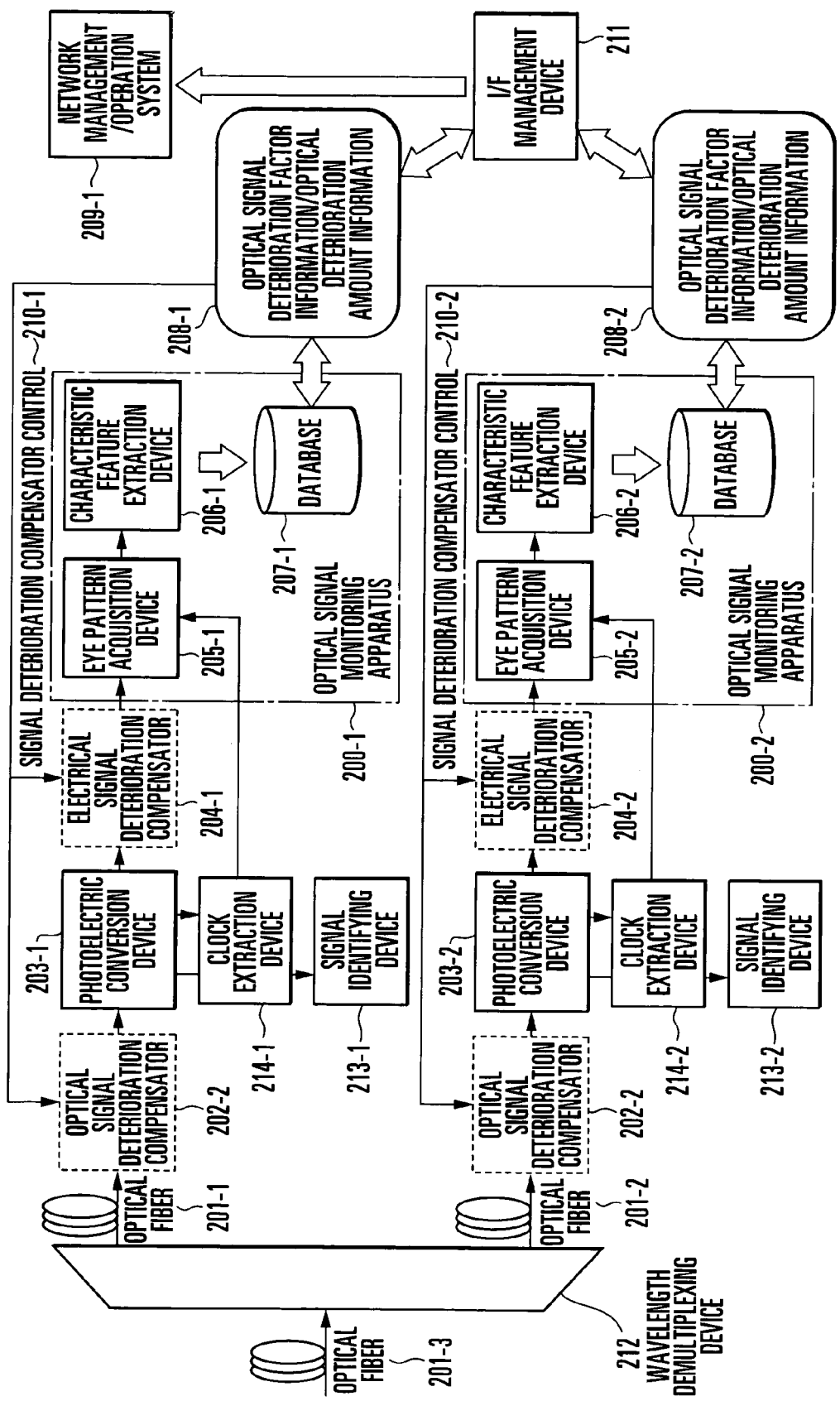
FIG. 2 is a block diagram showing another embodiment of the present invention.

FIG. 2 shows the arrangement of the second embodiment, which exemplifies the arrangement based on a combination of two optical signal monitoring apparatuses.

An optical signal monitoring apparatus 200-1 monitors an optical signal input to a photoelectric conversion device 203-1 through an optical fiber 201-1, and stores the resultant data in a database 207-1. The optical signal monitoring apparatus 200-1 also sends monitor information 208-1 to a network management/operation system 209-1 through an interface management device (to be referred to as I/F management device hereinafter) 211. An optical system monitoring apparatus 200-2 performs similar operation. The optical signal (signal A) monitored by the optical signal monitoring apparatus 200-1 and the optical signal (signal B) monitored by the optical system monitoring apparatus 200-2 are wavelength-multiplexed. The multiplexed signal is then demultiplexed into signals A and B, which are guided to the optical fiber 201-1 and an optical fiber 201-2, respectively.

Since the signals A and B are wavelength-length multiplexed in the optical fiber 201-3, quality deterioration may occur due to crosstalk between the wavelengths. Deterioration factors originating from crosstalk include, for example, XPM and FWM. Exchanging monitor information between the optical signal monitoring apparatuses 200-1 and 200-2 through the I/F management device 211 will facilitate specifying a deterioration factor between the wavelengths as crosstalk. The following is the reason for this. Assume that all patterns that characterize quality deterioration other than deterioration factors originating from crosstalk between wavelengths are stored in the database 207-1 and a database 207-2. Assume also that characteristic feature extraction devices 206-1 and 206-2 have extracted a characteristic pattern which is not registered in the databases 207-1 and 207-2. Assume further that this new unknown characteristic pattern (pattern C) has been extracted only when the signals A and B were wavelength-multiplexed on the optical fiber 201-3. In this case, it is expected that the deterioration factor is crosstalk between the wavelengths. At this time, the optical signal monitoring apparatuses 200-1 and 200-2 suggest to the network management/operation system 209-1 through the I/F management device 211 that signal deterioration due to crosstalk between wavelengths has occurred between the signals A and B on the optical fiber 201-3. The network management/operation system 209-1 notifies the transmission sources of the signals A and B of the corresponding information. The transmission sources then take measures, e.g., adjusting the signals A and B or the wavelengths of both the signals A and B, or adjusting the light intensities. Assume that the effects of the measures are immediately monitored by the optical signal monitoring apparatuses 200-1 and 200-2, and a pattern C has disappeared.

In this case, it is newly found that the pattern C is a deterioration pattern due to crosstalk between the wavelengths of the signals A and B. This pattern is then newly registered in the databases 207-1 and 207-2. This operation can be realized only when the optical signal monitoring apparatuses 200-1 and 200-2 exchange monitor information. That is, according to the present invention, in optical signal monitoring operation in an optical transmission system in which a plurality of optical signals are multiplexed, a deterioration factor and deterioration amount can be specified with higher precision by sharing monitor information on each optical signal channel than by performing monitoring operation for each optical channel.

In this case, the two optical signal monitoring apparatuses are combined. However, the number of optical signal monitoring apparatuses is not limited. In addition, the above description has exemplified the case wherein crosstalk between signals occurs when optical signals are wavelength-multiplexed. However, the factor for crosstalk is not limited to wavelengths. For example, crosstalk occurs as well when optical signals are polarization-multiplexed, code-multiplexed, or spatially multiplexed.

Figure 3:
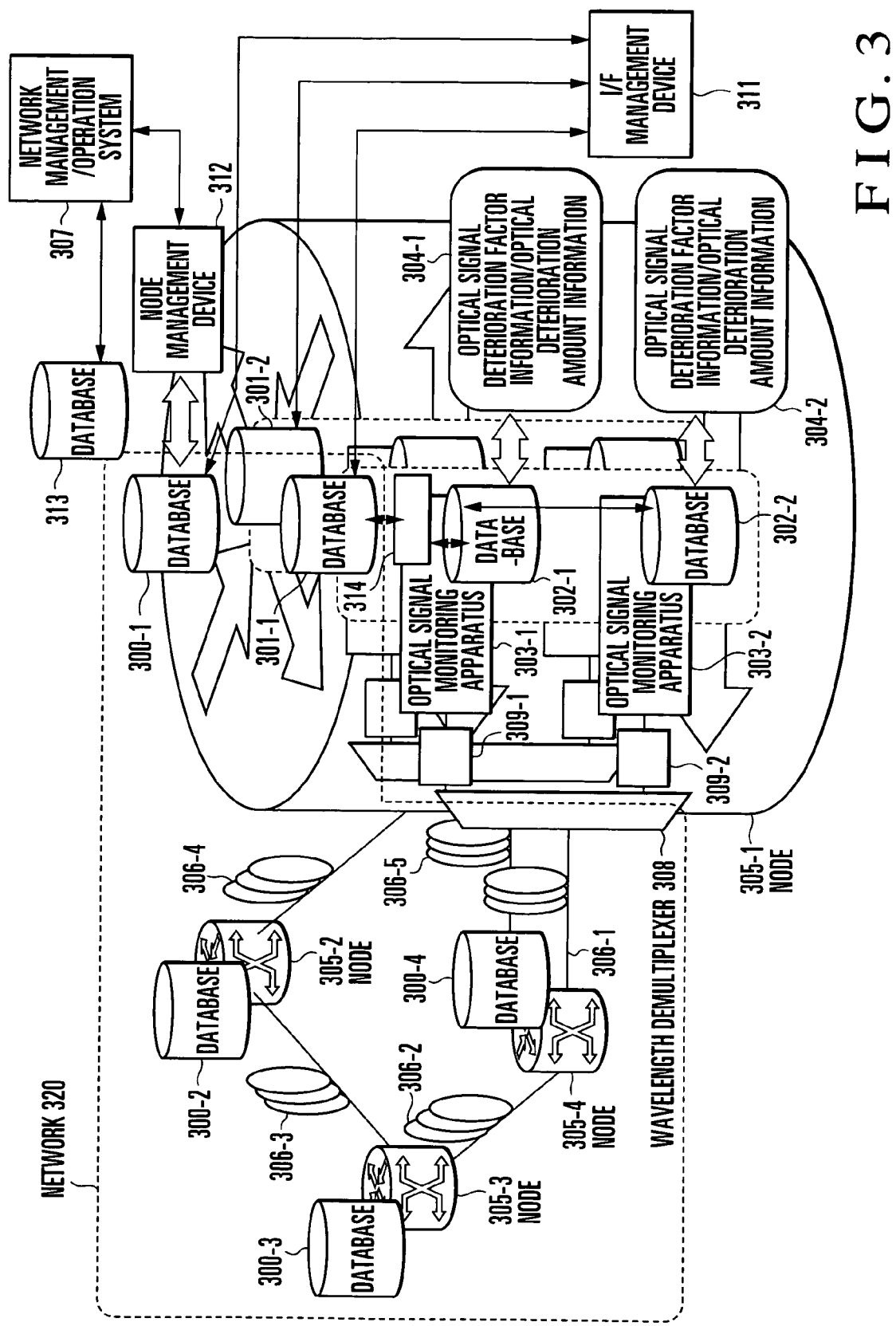
FIG. 3 is a block diagram showing the embodiment of the present invention.

FIG. 3 shows a case wherein the databases incorporated in the optical signal monitoring apparatuses described with reference to FIG. 2 are shared not only between the I/Fs but also between nodes and networks. As described with reference to FIG. 2, optical signal monitoring apparatuses 303-1 and 302-2 share databases 302-1 and 302-2 and pieces of monitor information 304-1 and 304-2 through the I/F management device 311. The optical signal monitoring apparatuses 303-1 and 303-2 respectively monitor signals A and B which are wavelength-multiplexed on an optical fiber 306-1 and demultiplexed by a wavelength demultiplexer 308 to be respectively guided to photoelectric conversion devices 309-1 and 309-2. By making the optical signal monitoring apparatuses 303-1 and 303-2 share pieces of monitor information makes it possible to specify a waveform deterioration factor which causes crosstalk between the wavelengths when the signals A and B are wavelength-multiplexed. In this embodiment, the databases 302-1 and 302-2 are integrated into databases 301-1 and 301-2 to a node 305-1 for each input optical fiber.

In addition, the databases 301-1 and 301-2 for each input optical fiber are integrated into a database 300-1 for the node 305-1. Nodes 305-2 to 305-4 in FIG. 3 respectively have these databases. The databases which the nodes 305-2 to 305-4 respectively have are databases 300-2 to 300-4. In addition, the databases 300-1 to 300-4 for the respective nodes are integrated into a database 313 for the overall network. A channel management device 314 has a function of accessing the databases 302-1 and 302-2 for the respective optical signal channels and the database 301-1 for each input optical fiber, and a function of constructing a database for each input optical fiber by integrating monitoring information for each optical signal channel. An I/F management device 311 has a function of accessing the databases 301-1 and 301-2 for the respective input fibers and the database 300-1 for each node, and a function of constructing a database for each node by integrating the databases for each input optical fiber to the node 305-1.

A node management device 312 has a function of accessing the database 300-1 for each node and a network management/operation system 307. The node management device 312 can notify the network management/operation system of the overall integration monitor information of the node 305-1, and receive pieces of monitor information of the other nodes 305-2 to 305-4 in a network 320. The network management/operation system 307 has a function of constructing the database 313 for the overall network 320 by obtaining integrated monitor information for each node from each of the nodes 305-1 to 305-4. Therefore, hierarchical monitor information databases are constructed on an optical signal channel basis, input optical fiber basis, node basis, and network basis. The network management/operation system 307 can access these databases. FIG. 6 shows the hierarchical relationship between the databases. Assume that an optical signal Z is transmitted from the node 305-2 as a transmission source to the node 305-1 through the nodes 305-3 and 305-4 to be wavelength-demultiplexed by the wavelength demultiplexer 308 and received by the photoelectric conversion device 309-1, and the optical signal monitoring apparatus 303-1 is monitoring the signal quality of the resultant signal.

The optical signal monitoring apparatus 303-1 can access the pieces of monitor information in the nodes 305-3 and 305-4 through which the optical signal Z passes, and hence can know at which position in the optical transmission path the deterioration has occurred. Assume that the nodes 305-1 to 305-4 do not share monitor information. In this case, when the optical signal Z undergoes quality deterioration, the optical signal monitoring apparatus 303-1 can know a deterioration factor and deterioration amount, but cannot know at which position in the transmission path, i.e., in which one of the optical fibers 306-3 to 306-1 and the nodes 305-3 and 305-4, the quality of the optical signal Z has deteriorated. It is important to know the occurrence position of deterioration, when monitor information is used as network management/operation information, as described with reference to the operation in FIG. 4.

Figure 7:
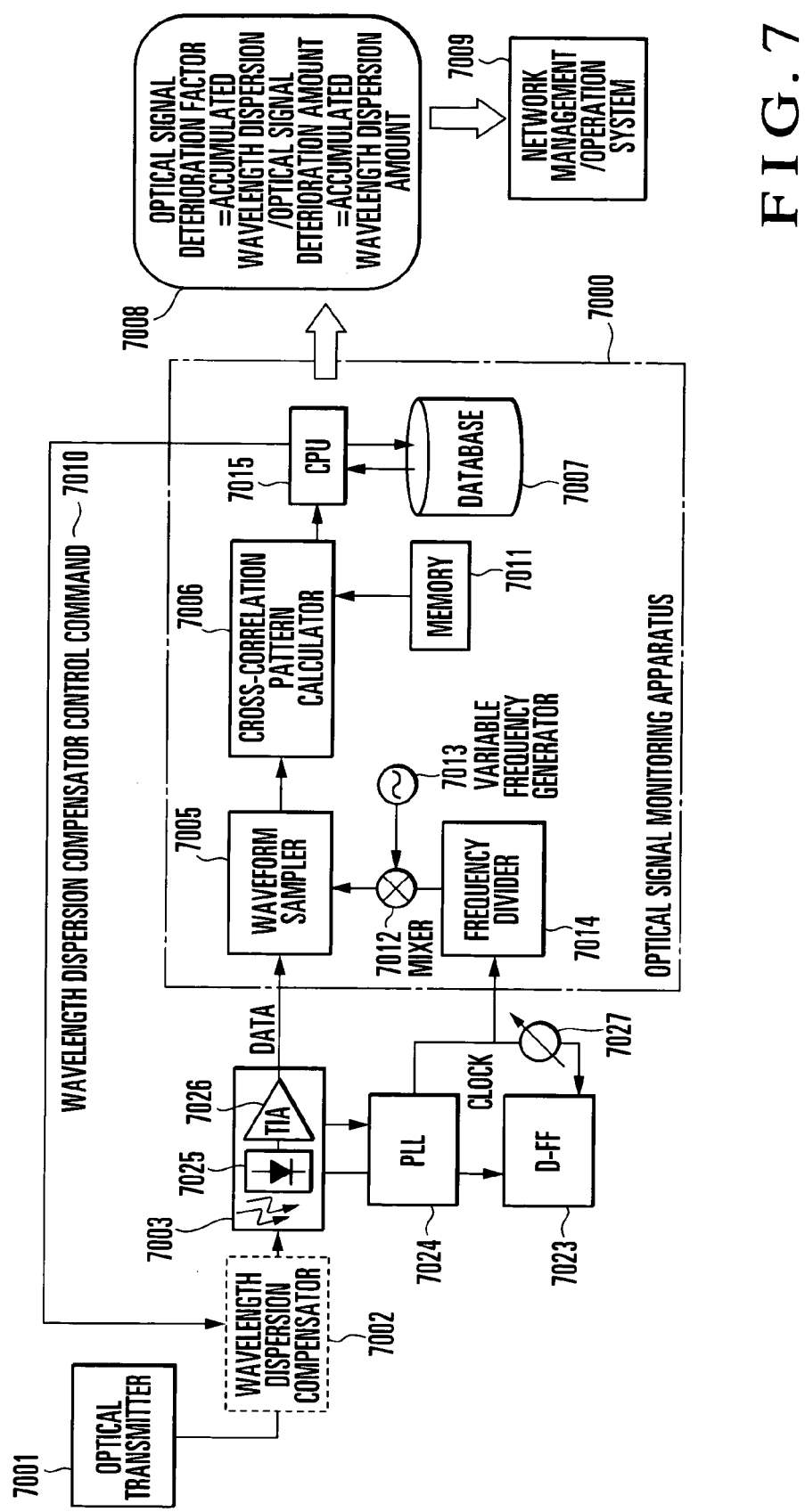
FIG. 7 is a block diagram showing the embodiment of the present invention.

FIG. 7 shows an embodiment in which self-learning of the database incorporated in the optical signal monitoring apparatus is performed on the assumption that wavelength dispersion is an optical signal deterioration factor. A light-receiving circuit 7003 photoelectrically converts an optical signal input from an optical fiber 7001, and sends the analog signal data to a waveform sampler 7005, PLL 7024, and D-FF 7023. The light-receiving circuit 7003 also supplies, to the PLL 7024 and D-FF 7023, the same electrical signal as that output to the waveform sampler 7005. The electrical signal supplied in this case is an analog signal containing waveform deterioration information due to optical transmission.

The PLL 7024 extracts a clock f from the electrical signal supplied from the light-receiving circuit 7003, and supplies the clock to a frequency divider 7014 and the D-FF 7023. The D-FF 7023 identifies a mark and space for each signal bit from the analog electrical signal supplied from the light-receiving circuit 7003 and the reproduction clock signal subjected to phase adjustment by a phase adjusting unit 7027, thereby converting the signal into a digital signal. The digitized signal is subjected as a reception signal to processing such as multiplexing/demultiplexing, and the resultant signal is converted into an optical signal again to be transferred to another node or distributed to the user connected to the self node. A mixer 7012 adds a clock Δf generated by a variable frequency generator 7013 to a clock f/N obtained by the frequency divider 7014 by 1/N frequency-dividing the clock f, thereby obtaining a clock given by f'=f+Δf. The waveform sampler 7005 samples the input analog signal with the clock f' to acquire an eye pattern, at a sampling period of Δf, which is temporally extended by N times with respect to the input signal. Using a clock obtained by frequency division instead of the frequency of an input signal eliminates the necessity to change the apparatus arrangement even when the input signal rate changes. Since the sampling period Δf can be adjusted by the variable frequency generator 7013, the eye pattern acquisition speed can also be adjusted. This makes it possible to flexibly acquire eye patterns with respect to input signals.

An ideal eye pattern without any deterioration due to wavelength dispersion is registered in a memory 7011. This eye pattern can be obtained by setting a wavelength dispersion compensator 7002 so as to add a wavelength dispersion of 0 to an optical signal.

A cross-correlation pattern calculator 7006 computes a cross-correlation pattern between the eye pattern acquired by the waveform sampler 7005 and the ideal eye pattern stored in the memory 7011. The cross-correlation pattern computation result is transferred to a CPU 7015 to extract a characteristic pattern therefrom. The CPU 7015 issues a control command 7010 to the wavelength dispersion compensator 7002 to add a wavelength dispersion to the optical signal without any accumulated wavelength dispersion which is output from the optical transmitter 7001.

FIG. 9 shows the eye pattern acquired by the waveform sampler 7005. The eye pattern shown in FIG. 9 has deteriorated due to accumulated wavelength dispersion. The cross-correlation pattern calculator 7006 performs cross-correlation computation for the waveform deterioration characteristic pattern in FIG. 10 which is extracted from the eye pattern in FIG. 9 which is being monitored. FIG. 11 shows one of the cross-correlation computation results obtained when the ideal eye pattern and accumulated wavelength dispersion amount stored in a database 7007 are changed. The computation in this case is not limited to cross-correlation computation, and another computation method may be used.

A correlation intensity peak value can be obtained from the pattern in FIG. 11. This correlation intensity peak value and the wavelength dispersion amount added to the optical signal by the wavelength dispersion compensator 7002 are recorded on the database 7007. By changing the wavelength dispersion amount to be added by the wavelength dispersion compensator 7002 in this manner and recording the correlation intensity peak value at each time, the relationship between the accumulated wavelength dispersion amount contained in the optical signal and the correlation intensity peak value can be obtained as shown in FIG. 15.

Figure 25:
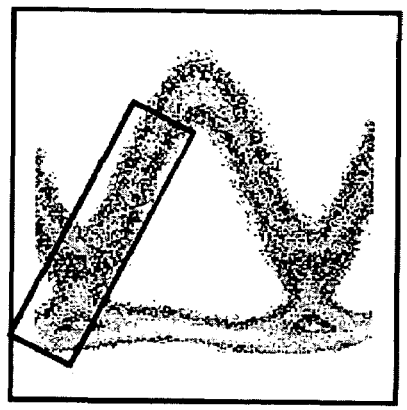
FIG. 25 is a view showing a leading edge portion as a characteristic pattern.
Figure 26:
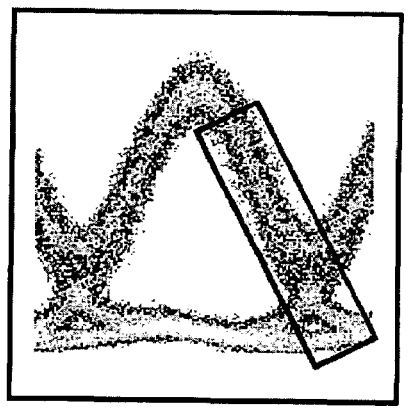
FIG. 26 is a view showing a trailing edge portion as a characteristic pattern.
Figure 27:
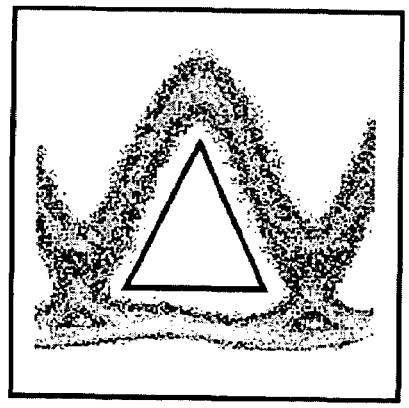
FIG. 27 is a view showing an eye opening portion as a characteristic pattern.

In this embodiment, the eye pattern in FIG. 10 which represents one bit of the optical signal is used as a characteristic pattern due to accumulated wavelength dispersion. However, there is no need to use an entire eye pattern representing one bit. For example, a space portion (FIG. 22), mark portion (FIG. 23), cross point (FIG. 24), leading edge portion (FIG. 25), trailing edge portion (FIG. 26), or eye opening portion (FIG. 27), or a combination of some of them may be used.

In this case, a correlation intensity peak is used as extracted information. However, extracted information is not limited to a correlation intensity peak. More specifically, another numerical value, the radius or ellipticity of a pattern obtained by setting a intensity threshold for a computation pattern (FIG. 11) and extracting a distribution equal to or more than the threshold, or the standard deviation or average value of a two-dimensional distribution (FIG. 13 or 14) like an intensity distribution on the pattern in FIG. 9 or 11 at a given time may be used. In addition, these values can be used in combination. In this manner, the characteristic pattern extracted from an eye pattern is made to correspond to a signal quality deterioration factor and deterioration amount, thereby making the database perform self-learning.

Although this embodiment has been described by taking accumulated wavelength dispersion as an optical signal quality deterioration factor, deterioration factors need not be limited to accumulated wavelength dispersion, and may include, for example, the S/N ratio of light, SPM (Self Phase Modulation), XPM (Cross Phase Modulation), FWM (Four Wave Mixing), and optical fiber end face reflection.

Third Embodiment

Figure 28:
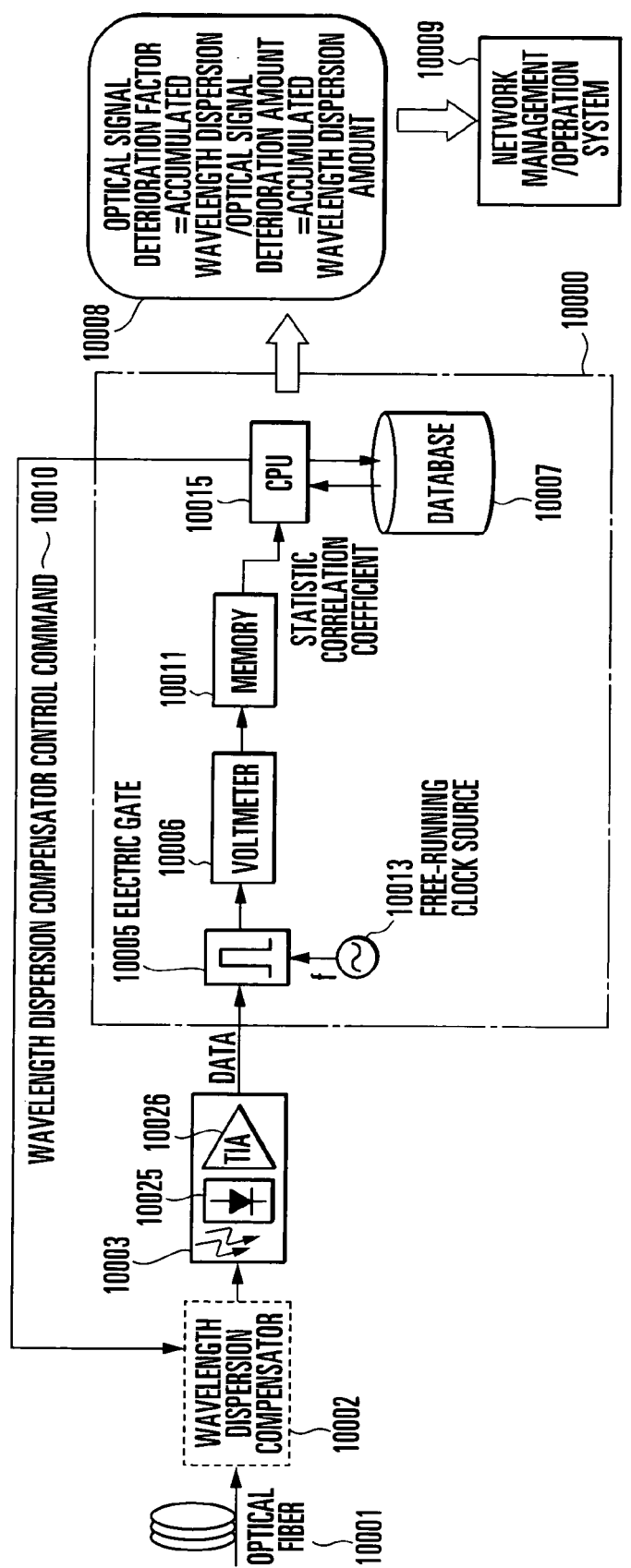
FIG. 28 is a block diagram showing still another embodiment of the present invention.

FIG. 28 shows the arrangement of the third embodiment, which is an example of the optical signal monitoring apparatus of the present invention using an intensity distribution.

Referring to FIG. 28, a wavelength dispersion compensator control 10002 is used as an optical signal deterioration compensator; a light-receiving circuit 10003 constituted by a PIN-photodiode (to be referred to as a PIN-PD hereinafter) 10025 and trans impedance amplifier (to be referred to as a TIA hereinafter) 10026, as a photoelectric conversion device; a device constituted by a free-running clock source 10013, electric gate 10005, voltmeter 10006, and memory 10011, as an intensity acquisition device; a CPU 10015, as a characteristic feature extraction device; and wavelength dispersion compensator control 10002, as a signal deterioration compensator control. The light-receiving circuit 10003 photoelectrically converts an optical signal input from an optical fiber 10001, and sends the resultant analog signal data to the electric gate 10005. The free-running clock source 10013 supplies an ON/OFF timing f to the electric gate 10005. An ideal intensity distribution without any deterioration due to wavelength dispersion is registered in a database 10007. The CPU 10015 computes a cross-correlation pattern between the intensity distribution acquired by the intensity distribution acquisition device and the ideal intensity distribution stored in the database 10007. The CPU 10015 also extracts a characteristic pattern from the cross-correlation pattern computation result. The correspondence map of characteristic patterns obtained in advance by measurement and optical signal deterioration factors is also stored in the database 10007. The CPU 10015 specifies accumulated wavelength dispersion as a signal deterioration factor from the correspondence map, and also specifies the accumulated wavelength dispersion amount. The CPU 10015 then obtains the accumulated wavelength dispersion amount contained in the optical signal input to the light-receiving circuit 10003. The CPU 10015 notifies a network management/operation system 10009 of accumulated wavelength dispersion which is an optical signal deterioration factor and its amount as information 10008. The network management/operation system can measure the qualities of services to be provided for customers by using the information 10008 as an information communication path management/operation information source at the optical signal level. In addition, upon specifying the information 10008, the CPU 10015 issues a control command 10010 for compensating for the signal deterioration to the wavelength dispersion compensator 10002. The wavelength dispersion compensator 10002 performs wavelength dispersion compensation for the optical signal input from the optical fiber 10001 by the amount designated by the CPU 10015.

The operation of the optical signal quality monitoring apparatus in FIG. 28 will be described next.

Figure 29:
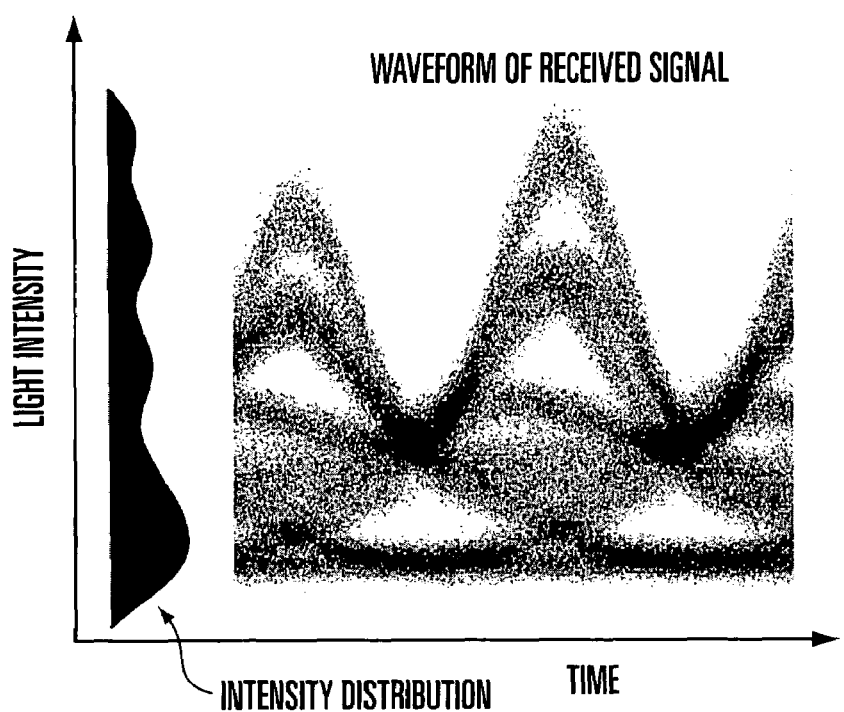
FIG. 29 is a graph showing an intensity distribution reflecting the waveform of a received optical signal.
Figure 30:
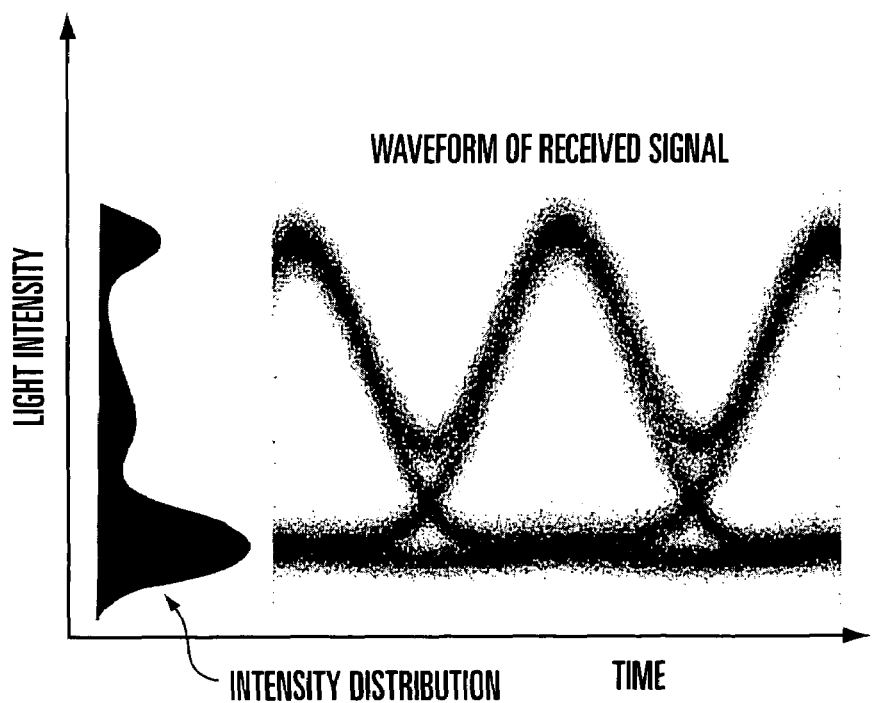
FIG. 30 is a graph showing an ideal intensity distribution without deterioration due to wavelength dispersion.

The operation of photoelectrically converting an optical signal input from the optical fiber 10001 by using the light-receiving circuit 10003 and the operation of performing cross-correlation computation, extracting a characteristic pattern from the computation result, specifying wavelength dispersion as an optical signal deterioration factor, and controlling the wavelength dispersion compensator control 10002 are the same as those described with reference to FIG. 4. The operation of acquiring an intensity distribution, which is different from the operation in FIG. 4, will be described below. The free-running clock source 10013 supplies the ON/OFF timing f to the electric gate 10005. The timing f need not be synchronous with the transmission clock f', but it is forbidden to set f=f'. This is because an electrical signal supplied from the light-receiving circuit 10003 is sampled by the electric gate 10005. When the electric gate 10005 is turned on, the voltmeter 10006 measures a voltage value. This value is stored in the memory 10011. When the voltage value sampled by the electric gate 10005 and voltmeter 10006 is repeatedly recorded on the memory 10011, an intensity distribution reflecting the waveform of the received optical signal is recorded on the memory 10011 as shown in FIG. 29. An ideal intensity distribution without any deterioration due to wavelength dispersion like that shown in FIG. 30 is registered in the database 10007.

A map which associates intensity distributions with optical signal deterioration factors is defined in advance in the database 10007. According to this map, for example, a deterioration due to wavelength dispersion is determined when the number of intensity distribution peaks acquired has increased by 1 or 2, and the width of each peak has increased, and deterioration due to polarization dispersion is determined when no increase in the number of peaks has occurred, and no change in the width of each peak has occurred. The CPU 10015 specifies a deterioration factor according to the map, and obtains a correlation amount by performing cross-correlation computation between the acquired intensity distribution shown in FIG. 29 and the ideal intensity distribution shown in FIG. 30, thus calculating a deterioration amount. This cross-correlation computation may be performed by using the entire intensity distributions shown in FIGS. 29 and 30 or by a method of selecting only a specific area in the pattern in FIG. 29 and using a corresponding area in the pattern in FIG. 30.

The first effect of the present invention is that optical signal quality can be monitored without any limitations on the transmission signal format of a signal and transmission rate. This is because, signal quality is monitored on the basis of the eye pattern of an optical signal, and hence monitoring operation is independent of the transmission signal format. In addition, applying the sampling scheme to the acquisition of eye patterns makes it possible to acquire eye patterns independently of the transmission rate.

The second effect of the present invention is that different kinds of signal quality can be monitored with the same hardware arrangement. This is because quality deteriorations due to different signal quality deterioration factors can be monitored by changing the characteristic feature to be extracted from an eye pattern.

The third effect of the present invention is that monitoring operation has no influence on a main signal. This is because monitoring can be done without superimposing any special signal for monitoring, modulation, or the like on the main signal.

The fourth effect of the present invention is that the apparatus arrangement is simple. This is because no device other than a monitoring apparatus, e.g., a multiplexing/demultiplexing device and modulation/demodulation device for a monitor signal, is required.

The fifth effect of the present invention is that optical signals can be monitored at a low cost. This is because no device other than a monitoring apparatus, e.g., a multiplexing/demultiplexing device and modulation/demodulation device for a monitor signal, is required. In addition, a monitoring apparatus is constituted by an eye pattern acquisition device, characteristic feature extraction device, and database. Each of these components is an electrical component, and hence monitoring can be implemented without using any expensive optical components. Furthermore, the characteristic feature extraction device and database can be implemented by combining inexpensive LSIs.

The sixth effect of the present invention is that a monitoring method and apparatus can be provided, which allow easy addition of a monitoring function. This is because an existing photoelectric conversion apparatus can be upgraded into a photoelectric conversion apparatus having an optical signal quality monitoring function by only adding the monitoring apparatus of the present invention.

The seventh effect of the present invention is that improvements in monitoring function, e.g., an increase in monitoring precision and addition of monitor items, can be realized without changing the hardware arrangement. This is because an increase in monitoring precision and addition of monitor items can be realized by changing the database in the monitoring apparatus.

The eighth effect of the present invention is that monitor information can be used as network management/operation information. This is because sharing monitor information between monitoring apparatuses makes it possible to detect crosstalk between communication channels, a quality deterioration position in a network, the deterioration occurrence time, the duration of deterioration, and the like. When, for example, a communication line provided for a user is provided by a plurality of service providers, knowing the occurrence position of a quality deterioration can specify which service provider should handle the problem and also specify a signal quality deterioration factor which should be handled. This makes it possible to quickly grasp, for example, a specific apparatus or component which should be replaced.

The ninth effect of the present invention is that monitor information can be used as control information for a waveform deterioration compensator. This is because, since a signal quality deterioration factor and deterioration amount can be known, the waveform deterioration compensator which can compensate for the deterioration factor can be controlled by notifying the apparatus of the deterioration amount as control information.

The 10th effect of the present invention is that optical transmission characteristics can be improved. This is because, since signal quality can be improved by adding a waveform deterioration compensator to a monitoring apparatus and controlling the waveform deterioration compensator on the basis of monitor information, an increase in transmission distance and multiplexing with a high density can be realized as compared with a case wherein no monitoring is done.

What is claimed is:

1. A method of monitoring an optical signal in a an optical network, comprising:
    acquiring an eye pattern from the optical signal;
    extracting an area of the eye pattern which corresponds to a characteristic feature of the eye pattern, wherein the characteristic feature characterizes a deterioration;
    providing a database which stores a map which associates a quality deterioration factor and a deterioration amount of the optical signal with a characteristic feature of the eye pattern of the optical signal;
    collating the extracted characteristic feature of the eye pattern with the map stored in the database; and
    monitoring the quality deterioration factor and deterioration amount of the optical signal, an occurrence time of a deterioration, a duration of a deterioration, a deterioration occurrence cycle, and a deterioration duration cycle.

2. A method according to claim 1, wherein as a pattern to be collated, a computation result of the predetermined characteristic pattern of the area of the eye pattern of the optical signal which characterizes the quality deterioration factor and deterioration amount of the optical signal to be monitored and a pattern of an area corresponding to an area of an ideal eye pattern without deterioration is used.

3. A method according to claim 1, wherein as a pattern to be collated, a computation result of the predetermined characteristic pattern of the area of the intensity distribution of the optical signal which characterizes the quality deterioration factor and deterioration amount of the optical signal to be monitored and a pattern of an area corresponding to an area of an ideal intensity distribution without deterioration is used.

4. A method according to claim 1, wherein as data to be collated, an intensity distribution of an eye pattern of an optical signal to be monitored at a given time is used.

5. A method according to claim 1, wherein as data to be collated, an intensity distribution of a computation result at a given time is used.

6. A method according to claim 1, wherein as data to be collated, a temporal variation distribution of an eye pattern of an optical signal to be monitored at a given intensity is used.

7. A method according to claim 1, wherein as data to be collated, a temporal variation distribution of a computation result at a given intensity is used.

8. A method according to claim 1, wherein a light intensity distribution is used as data to be collated in place of an eye pattern of an optical signal to be monitored, and a light intensity distribution is used as a characteristic pattern.

9. A method according to claim 1, wherein in addition to the predetermined characteristic pattern of the area of the eye pattern of the optical signal, which characterizes the deterioration, a combination of a temporal variation distribution of an eye pattern of an optical signal to be monitored at a given intensity and an intensity distribution of the eye pattern at a given time is used as data to be collated.

10. A method according to claim 1, wherein in addition to a computation result of an ideal eye pattern and the predetermined characteristic pattern of the area of the eye pattern of the optical signal, which characterizes the deterioration, a combination of a temporal variation distribution of the computation result at a given intensity and an intensity distribution of the computation result at a given time is used as data to be collated.

11. A method according to claim 1, wherein cross-correlation is used as collation.

12. A method according to claim 1, wherein cross-correlation is used as computation, and cross-correlation is used as collation.

13. A method according to claim 1, wherein when a deterioration factor and deterioration amount cannot be determined from only a pattern which is obtained by monitoring and characterizes a deterioration, a deterioration factor and deterioration amount are determined on the basis of an occurrence time of the deterioration, duration of the deterioration, a deterioration occurrence cycle, and a deterioration duration cycle, in addition to the characteristic pattern.

14. A method according to claim 1, wherein when a deterioration factor and deterioration amount cannot be determined from only a pattern which is obtained by monitoring and characterizes a deterioration and an ideal pattern, a deterioration factor and deterioration amount are determined on the basis of an occurrence time of the deterioration, duration of the deterioration, a deterioration occurrence cycle, and a deterioration duration cycle, in addition to the characteristic pattern.

15. A method according to claim 1, wherein as an ideal eye pattern without deterioration, an eye pattern at a transmission source of an optical signal to be monitored is used.

16. A method according to claim 1, wherein a function of compensating for a deterioration in quality of an optical signal is provided outside, the optical signal quality deterioration compensation function is controlled by notifying the optical signal quality deterioration compensation function of a monitored signal quality deterioration factor and deterioration amount, thereby improving optical transmission characteristics.

17. A method according to claim 1, further comprising the step of, when a network management/operation system which manages/operates a network in which an optical signal to be monitored is included exists, and access can be made to the network management/operation system, notifying the network management/operation system of a monitored signal quality deterioration factor, a deterioration amount, an occurrence time of a deterioration, duration of the deterioration, and a deterioration occurrence position, thereby using the optical signal quality deterioration information as network management/operation information.

18. A method according to claim 1, further comprising the step of, when an optical signal quality deterioration compensation function is provided outside, controlling the optical signal quality deterioration compensation function to intentionally make quality of an optical signal deteriorate, and recording a correspondence relationship between an eye pattern which has deteriorated and a deterioration amount added by the optical signal quality deterioration compensation function, thereby autonomously constructing the database.

19. An optical signal monitoring method in an optical network, comprising the steps of:
inputting a multiplexed optical signal;
demultiplexing the input optical signal into a signal for each channel;
sharing monitor information about the wavelength dispersion and the polarization dispersion for the optical signal of each channel between databases respectively provided for each channel;
collating information extracted from the demultiplexed optical signal with the monitor information registered in the databases to thereby monitor the wavelength dispersion and the polarization dispersion of the optical signal for each channel; and
when the extracted information does not coincide with the monitor information registered in the databases, determining that a major factor of the optical signal deterioration is attributable to multiplexing of the optical signal.

20. An optical signal monitoring method in wavelength multiplexing and an optical network, comprising:
the step of, when an optical signal to be monitored is multiplexed, demultiplexing the optical signal for each signal channel, then monitoring an optical signal for each channel, constructing monitor information on an optical signal input basis by integrating monitor information for each channel of the optical signal, and accessing the monitor information on the optical signal input basis to recognize that a signal quality deterioration factor and deterioration amount are based on an influence of a channel other than a self channel;
the step of determining a signal quality deterioration factor and deterioration amount based on an influence of another channel other than a self optical signal;
the step of, when there are a plurality of optical signal inputs which are multiplexed or not multiplexed on a node which receives the optical signal, constructing monitor information on a node basis by integrating monitor information on the optical signal input basis, and accessing the monitor information on the node basis to recognize that a signal quality deterioration factor and deterioration amount are based on an influence of an optical signal input other than an optical signal input including a self optical signal input signal;
the step of, when a signal quality deterioration factor and deterioration amount based on an influence of an optical signal input other than an optical signal input including the self optical signal are determined, and the optical signal is monitored through a plurality of nodes inside a network, constructing monitor information on a network basis by integrating monitor information on the node basis, and accessing the monitor information on the network basis to recognize that the signal quality deterioration factor and deterioration amount are based on an influence produced when the optical signal is transmitted through a node other than a node including the self node or a transmission path; and
the step of detecting a specific position in the network at which the signal quality deterioration factor and deterioration amount caused when the optical signal is transmitted through the node other than the node including the self node or the transmission path have occurred, and determining the signal quality deterioration factor and deterioration amount based on the influence produced when the optical signal is transmitted through the node other than node including the self node or the transmission path.

21. A method according to claim 20, wherein when a network management/operation system which manages/operates a network exists, and the network management/operation system can access monitor information on an optical signal channel basis, monitor information on an optical signal input basis, monitor information on a node basis, and monitor information on a network basis, the monitor information on the optical signal channel basis, the monitor information on the optical signal input basis, the monitor information on the node basis, and the monitor information on the network basis are used as network management/operation information.

22. An optical signal monitoring apparatus in an optical network, comprising:
 a database which stores a map which associates a quality deterioration factor and a deterioration amount of an optical signal with a predetermined characteristic feature of an area of an eye pattern of the optical signal;
 an eye pattern acquisition device which acquires an eye pattern from the optical signal based on an output signal obtained by photoelectrically converting the optical signal; and
 a characteristic feature extraction device which extracts an area corresponding to a characteristic feature from the eye pattern of the optical signal, and collates the extracted feature with the map stored in said database,
 wherein the quality deterioration factor and the deterioration amount of the optical signal, an occurrence time of a deterioration, a duration of a deterioration, a deterioration occurrence cycle, and a deterioration duration cycle are monitored.

23. An apparatus according to claim 22, wherein as a pattern to be collated, a computation result of the predetermined characteristic pattern of the area of the eye pattern of the optical signal which characterizes the quality deterioration factor and deterioration amount of the optical signal to be monitored and a pattern of an area corresponding to an area of an ideal eye pattern without deterioration is used.

24. An apparatus according to claim 22, wherein as a pattern to be collated, a computation result of the predetermined characteristic pattern of the area of the intensity distribution of the optical signal which characterizes the quality deterioration factor and deterioration amount of the optical signal to be monitored and a pattern of an area corresponding to an area of an ideal intensity distribution without deterioration is used.

25. An apparatus according to claim 22, wherein as data to be collated, an intensity distribution of an eye pattern of an optical signal to be monitored at a given time is used.

26. An apparatus according to claim 22, wherein as data to be collated, an intensity distribution of a computation result at a given time is used.

27. An apparatus according to claim 22, wherein as data to be collated, a temporal variation distribution of an eye pattern of an optical signal to be monitored at a given intensity is used.

28. An apparatus according to claim 22, wherein as data to be collated, a temporal variation distribution of a computation result at a given intensity is used.

29. An apparatus according to claim 22, wherein a light intensity distribution is used as data to be collated in place of an eye pattern of an optical signal to be monitored, and a light intensity distribution is used as a characteristic pattern.

30. An apparatus according to claim 22, wherein in addition to the predetermined characteristic pattern of the area of the eye pattern of the optical signal, which characterizes the deterioration, a combination of a temporal variation distribution of an eye pattern of an optical signal to be monitored at a given intensity and an intensity distribution of the eye pattern at a given time is used as data to be collated.

31. An apparatus according to claim 22, wherein in addition to a computation result of an ideal eye pattern and the predetermined characteristic pattern of the area of the eye pattern of the optical signal, which characterizes the deterioration, a combination of a temporal variation distribution of the computation result at a given intensity and an intensity distribution of the computation result at a given time is used as data to be collated.

32. An apparatus according to claim 22, wherein cross-correlation is used as collation.

33. An apparatus according to claim 22, wherein cross-correlation is used as computation, and cross-correlation is used as collation.

34. An apparatus according to claim 22, wherein when a deterioration factor and deterioration amount cannot be determined from only a pattern which is obtained by monitoring and characterizes a deterioration, a deterioration factor and deterioration amount are determined on the basis of an occurrence time of the deterioration, duration of the deterioration, a deterioration occurrence cycle, and a deterioration duration cycle, in addition to the characteristic pattern.

35. An apparatus according to claim 22, wherein when a deterioration factor and deterioration amount cannot be determined from only a pattern which is obtained by monitoring and characterizes a deterioration and an ideal pattern, a deterioration factor and deterioration amount are determined on the basis of an occurrence time of the deterioration, duration of the deterioration, a deterioration occurrence cycle, and a deterioration duration cycle, in addition to the characteristic pattern.

36. An apparatus according to claim 22, wherein as an ideal eye pattern without deterioration, an eye pattern at a transmission source of an optical signal to be monitored is used.

37. An apparatus according to claim 22, wherein an optical signal quality deterioration compensator is provided outside, the optical signal quality deterioration compensator is controlled by notifying the optical signal quality deterioration compensator of a monitored signal quality deterioration factor and deterioration amount, thereby improving optical transmission characteristics.

38. An apparatus according to claim 22, wherein said apparatus further comprises means for, when a network management/operation system which manages/operates a network in which an optical signal to be monitored is included exists, and access can be made to the network management/operation system, notifying the network management/operation system of a monitored signal quality deterioration factor, a deterioration amount, an occurrence time of a deterioration, duration of the deterioration, and a deterioration occurrence position, and the notified optical signal quality deterioration information is used as network management/operation information.

39. An apparatus according to claim 22, further comprising means for, when an optical signal quality deterioration compensator is provided outside, controlling the optical signal quality deterioration compensator to intentionally make quality of an optical signal deteriorate, and recording a correspondence relationship between an eye pattern which has deteriorated and a deterioration amount added by the optical signal quality deterioration compensator, thereby autonomously constructing the database.

40. An optical signal monitoring apparatus in wavelength multiplexing and an optical network, comprising means for, when an optical signal to be monitored is multiplexed,
 inputting a multiplexed optical signal;
 demultiplexing the input optical signal into a signal for each channel;

sharing monitor information about the wavelength dispersion and the polarization dispersion for the optical signal of each channel between databases respectively provided for each channel;

collating information extracted from the demultiplexed optical signal with the monitor information registered in the databases to thereby monitor the wavelength dispersion and the polarization dispersion of the optical signal for each channel; and when the extracted information does not coincide with the monitor information registered in the databases, determining that a major factor of the optical signal deterioration is attributable to multiplexing of the optical signal.

41. An optical signal monitoring apparatus in wavelength multiplexing and an optical network, comprising means for, when an optical signal to be monitored is multiplexed, demultiplexing the optical signal for each signal channel, then monitoring an optical signal for each channel, constructing monitor information on an optical signal input basis by integrating monitor information for each channel of the optical signal, accessing the monitor information on the optical signal input basis to recognize that a signal quality deterioration factor and deterioration amount are based on an influence of a channel other than a self channel, determining a signal quality deterioration factor and deterioration amount based on an influence of another channel other than a self optical signal, when there are a plurality of optical signal inputs which are multiplexed or not multiplexed on a node which receives the optical signal, constructing monitor information on a node basis by integrating monitor information on the optical signal input basis, accessing the monitor information on the node basis to recognize that a signal quality deterioration factor and deterioration amount are based on an influence of an optical signal input other than an optical signal input including a self optical signal input, when a signal quality deterioration factor and deterioration amount based on an influence of an optical signal input other than an optical signal input including the self optical signal are determined, and the optical signal is monitored through a plurality of nodes inside a network, constructing monitor information on a network basis by integrating monitor information on the node basis, accessing the monitor information on the network basis to recognize that the signal quality deterioration factor and deterioration amount are based on an influence produced when the optical signal is transmitted through a node other than a node including the self node or a transmission path, detecting a specific position in the network at which the signal quality deterioration factor and deterioration amount caused when the optical signal is transmitted through the node other than the node including the self node or the transmission path have occurred, and determining the signal quality deterioration factor and deterioration amount based on the influence produced when the optical signal is transmitted through the node other than node including the self node or the transmission path.

42. An apparatus according to claim 41, further comprising means for, when a network management/operation system which manages/operates a network exists, and the network management/operation system can access monitor information on an optical signal channel basis, monitor information on an optical signal input basis, monitor information on a node basis, and monitor information on a network basis, using the monitor information on the optical signal channel basis, the monitor information on the optical signal input basis, the monitor information on the node basis, and the monitor information on the network basis as network management/operation information.

* * * * *